US008530715B2

(12) United States Patent
Strege et al.

(10) Patent No.: US 8,530,715 B2
(45) Date of Patent: *Sep. 10, 2013

(54) PROCESS FOR THE CONVERSION OF RENEWABLE OILS TO LIQUID TRANSPORTATION FUELS

(71) Applicant: Energy & Environmental Research Center Foundation, Grand Forks, ND (US)

(72) Inventors: Joshua R. Strege, Grand Forks, ND (US); Benjamin G. Oster, Thompson, ND (US); Paul D. Pansegrau, Grand Forks, ND (US); Chad A. Wocken, Grand Forks, ND (US); Ted R. Aulich, Grand Forks, ND (US); Marc D. Kurz, Thompson, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,400

(22) Filed: Nov. 9, 2012

(65) Prior Publication Data

US 2013/0072731 A1    Mar. 21, 2013

Related U.S. Application Data

(63) Continuation of application No. 13/335,803, filed on Dec. 22, 2011, now Pat. No. 8,309,783, which is a continuation-in-part of application No. 12/493,193, filed on Jun. 27, 2009, now Pat. No. 8,247,632, which is a continuation-in-part of application No. 12/264,689, filed on Nov. 4, 2008, now Pat. No. 7,989,671.

(51) Int. Cl.
C07C 1/00 (2006.01)

(52) U.S. Cl.
USPC ........... 585/733; 585/240; 585/469; 585/638; 44/307; 44/308; 44/384; 44/385; 44/386; 44/411; 44/605

(58) Field of Classification Search
USPC .................. 585/240, 469, 638, 733; 44/306, 44/605
See application file for complete search history.

(56) References Cited

U.S. PATENT DOCUMENTS 4,992,605 A    2/1991  Craig et al.
5,705,722 A    1/1998  Monnier et al.
(Continued)

FOREIGN PATENT DOCUMENTS

CA   2149685 A1   12/1995
EP   0430579 A2    6/1991
(Continued)

OTHER PUBLICATIONS

Snare, M. et al. (2006). Ind. Eng. Chem. Res., 45, 5708-5715.*
(Continued)

*Primary Examiner* — Brian McCaig
(74) *Attorney, Agent, or Firm* — Schwegmen Lundberg & Woessner, P.A.

(57) ABSTRACT

The present invention relates to production of fuels or fuel blendstocks from renewable sources. Various embodiments provide a method of producing a hydrocarbon product by hydrotreating a feedstock including at least one of a renewable triacylglyceride (TAG), renewable free fatty acid (FFA), and renewable fatty acid $C_1$-$C_5$ alkyl ester ($C_1$-$C_5$ FAE) in the presence of a nonsulfided hydrotreating catalyst to produce a first product including hydrocarbons. In some examples, the first product can be subjected to further chemical transformations such as aromatization, cracking, or isomerization to produce a second product including hydrocarbons. In various embodiments, the first or second hydrocarbon product with minimal or substantially no further processing can be suitable as a liquid transportation fuel or fuel blendstock, including fuels such as gasoline, naptha, kerosene, jet fuel, and diesel fuels.

20 Claims, 2 Drawing Sheets

(56) References Cited

U.S. PATENT DOCUMENTS

| | | |
|---|---|---|
| 6,420,322 B1 | 7/2002 | Kodali |
| 7,816,570 B2 | 10/2010 | Roberts, IV et al. |
| 7,989,671 B2 | 8/2011 | Strege et al. |
| 8,247,632 B2 | 8/2012 | Strege et al. |
| 8,309,783 B2 | 11/2012 | Strege et al. |
| 2004/0230085 A1 | 11/2004 | Jakkula et al. |
| 2006/0161032 A1 | 7/2006 | Murzin et al. |
| 2006/0207166 A1 | 9/2006 | Herskowitz et al. |
| 2007/0010682 A1 | 1/2007 | Myllyoja et al. |
| 2007/0112224 A1 | 5/2007 | Krafft et al. |
| 2007/0175795 A1 | 8/2007 | Yao et al. |
| 2008/0071125 A1 | 3/2008 | Li |
| 2009/0069610 A1 | 3/2009 | Roberts, IV et al. |
| 2009/0250376 A1 | 10/2009 | Brandvold et al. |
| 2010/0113848 A1 | 5/2010 | Strege et al. |
| 2010/0163458 A1 | 7/2010 | Daudin et al. |
| 2010/0240942 A1 | 9/2010 | Daudin et al. |
| 2012/0157734 A1 | 6/2012 | Strege et al. |

FOREIGN PATENT DOCUMENTS

| | | |
|---|---|---|
| EP | 1396531 A1 | 3/2004 |
| WO | WO-2004022674 A1 | 3/2004 |
| WO | WO-2006075057 A1 | 7/2006 |
| WO | WO-2007003709 A1 | 1/2007 |
| WO | WO-2008312480 A1 | 12/2008 |
| WO | WO-2011094149 A1 | 4/2011 |

OTHER PUBLICATIONS

Simacek, P. et al. (2011). Fuel, 90, 2473-2479.*

Abbott, M.M. et al. (1989). Thermodynamics with Chemical Applications, 2nd ed, McGraw-Hill, 362 pgs.*

Weisser, O, et al., "Sulphide Catalysts: their properties and applications", Pergamon Press—Chapters 2, 3 and 5, (1973), 15-36 and 74-116.

"U.S. Appl. No. 12/493,193, filed Jun. 27, 2009", 29 pgs.

"U.S. Appl. No. 12/493,193, Non Final Office Action mailed Dec. 22, 2010", 9 pgs.

"U.S. Appl. No. 12/493,193, Notice of Allowance mailed May 16, 2012", 8 pgs.

"U.S. Appl. No. 13/335,803, Non Final Office Action mailed Apr. 18, 2012", 9 pgs.

"U.S. Appl. No. 13/335,803, Notice of Allowance mailed Sep. 11, 2012", 7 pgs.

"U.S. Appl. No. 13/335,803, Response filed Jul. 18, 2012 to Non Final Office Action mailed Apr. 18, 2012", 9 pgs.

"International Application Serial No. PCT/US2009/063059, International Search Report and Written Opinion mailed May 26, 2010", 6 pgs.

Kalnes, Tom, et al., "Green Diesel: A Second Generation Biofuel", International Journal of Chemical Reactor Engineering: vol. 5: A48, http://www.bepress.com/ijcre/vol5/A48.

"International Application Serial No. PCT/US2012/070381, International Search Report mailed Apr. 8, 2013", 4 pgs.

"International Application Serial No. PCT/US2012/070381, Written Opinion mailed Apr. 8, 2013", 12 pgs.

* cited by examiner

PROCESS FOR THE CONVERSION OF RENEWABLE OILS TO LIQUID TRANSPORTATION FUELS

CROSS REFERENCE TO RELATED APPLICATIONS

This application is a continuation of U.S. patent application Ser. No. 13/335,803, filed on Dec. 22, 2011, (now U.S. Pat. No. 8,309,783), which is a continuation-in-part of U.S. patent application Ser. No. 12/493,193, filed on Jun. 27, 2009, (now U.S. Pat. No. 8,247,632), which is a continuation-in-part of U.S. patent application Ser. No. 12/264,689, filed on Nov. 4, 2008, entitled "PROCESS FOR THE CONVERSION OF RENEWABLE OILS TO LIQUID TRANSPORTATION FUELS" (now U.S. Pat. No. 7,989,671), the disclosures of which are herein incorporated by reference.

STATEMENT OF GOVERNMENT SUPPORT

This invention was made with U.S. government support under Cooperative Agreement No. W9132T-08-2-0014 awarded by the U.S. Army Construction Engineering Research Laboratory. The government has certain rights in this invention.

FIELD OF THE INVENTION

The invention relates to a method for the conversion of renewable fats and oils (triacylglycerides, or TAGs) to hydrocarbons. The invention also accommodates the production of hydrocarbons from fatty acid $C_1$-$C_5$ alkyl esters ($C_1$-$C_5$ FAEs) or free fatty acids (FFAs). In some examples, FFAs or $C_1$-$C_5$ FAEs can be derived from TAGs. The fats and oils can be derived from biomaterials such as plants, animals, or algae, or mixtures thereof. The method is applicable to the manufacture of liquid transportation fuels, for example, such as gasoline, naphtha, kerosene, jet, and diesel fuels. The method is also applicable to the manufacture of other hydrocarbons.

BACKGROUND OF THE INVENTION

Increasing costs for petroleum-derived fuels are driving interest in alternative starting materials (feedstocks) for the production of fuels. Additionally, concern over increasing atmospheric carbon dioxide levels has spawned interest in "carbon-neutral" fuels. One possible solution to both of these issues is the utilization of TAG feedstocks for the production of hydrocarbon-based transportation fuels.

Certain TAGs are already utilized as feedstocks for the production of "biodiesel." In this process, the TAG is transesterified with methanol, ethanol, or another $C_1$-$C_5$ alcohol, to provide a $C_1$-$C_5$ FAE and glycerine. The $C_1$-$C_5$ FAE is separated, purified, and sold as an additive, supplementing petroleum-derived diesel fuel. $C_1$-$C_5$ FAE diesel additives provide certain specific benefits to their use (e.g., lubricity), but suffer serious physical limitations when used as the sole fuel and not as a blendstock (e.g., cold-flow properties).

$C_1$-$C_5$ FAE diesel fuel represents a first-generation bio-derived fuel. The shortcomings of this generation of fuel are directly related to the fuel-possessing oxygen functionality. A second-generation fuel possesses no oxygen functionality, providing a more petroleum-like product with respect to elemental composition, and is oftentimes termed "renewable diesel."

Recent publications and patents have described the conversion of TAG to hydrocarbon fuels via technology oftentimes referred to as "hydrodeoxygenation." This technology converts the fatty acid-portion of a TAG to a hydrocarbon having the same number of carbons as the fatty acid-portion or to a hydrocarbon possessing one carbon less than the fatty acid-portion. The glycerine portion of the TAG is most often converted to propane or otherwise lost within the process.

The glycerine portion of the TAG possesses economic value in itself greater than that of propane and, as such, could be an important economic by-product from an overall process that would provide glycerine as a by-product.

Certain patents list strategies for limiting the acidity of the fuel that is produced. This can include recycle of the product with fresh feedstock over the catalyst bed and limiting the total acidity of the product introduced to the catalyst.

A major difference between a fatty acid and a TAG is the nature of the carboxyl functionality present in each compound. For the TAG, the acid is present as an ester (carboxylate) functionality. For the fatty acid, the acid is present as a carboxylic acid. It is well established that an ester functionality is more easily reduced to a saturated hydrocarbon via hydrogenation technology than is a carboxylic acid functionality. This limits the amount of fatty acid that can be present in the feedstock and feedstock blends.

One method describes the conversion of depitched tall oil to a diesel fuel additive (see generally Canadian Patent 2,149, 685). The method describes a hydrodeoxygenation process utilizing a hydrotreating catalyst. The catalyst is prepared by presulfiding. The sulfided nature of the catalyst can be maintained by adding sulfur to the tall oil feedstock at a level of 1000 ppm. The doping agent is carbon disulfide. The hydrodeoxygenation conversion is then performed at 410° C. and 1200 psi.

Another method describes the preparation of a diesel fuel from a vegetable TAG oil (see generally U.S. Patent Application 2007/0010682). The TAG oil is doped with 50 to 20,000 ppm sulfur. The hydrodeoxygenation step is performed between 580 and 725 psi and 305° and 360° C.

SUMMARY OF THE INVENTION

Accordingly, there is a need for a method of producing paraffinic hydrocarbons from a feedstock including at least one of TAGs, FFAs, or $C_1$-$C_5$ FAEs without the need for presulfiding the hydrotreating catalyst or doping the feedstock with sulfur. There is a need for an efficient hydrotreating process with few or no additional processing steps wherein the product includes hydrocarbons that can form fuel or fuel blendstocks, wherein the fuel has hydrocarbon chain lengths distributed similarly to those in conventional petroleum-derived fuels. Additionally, there is a need for a method that can efficiently reduce fatty acids or fatty acid esters to hydrocarbons, with no limitation to the amount of fatty acids or fatty acid esters that can be present in the feedstock blend.

In various embodiments, the present invention provides a method of producing a hydrocarbon product. The method includes hydrotreating a feedstock comprising at least one of a renewable triacylglyceride (TAG), renewable fatty acid (FFA), renewable fatty acid $C_1$-$C_5$ alkyl ester ($C_1$-$C_5$ FAE), or a mixture thereof, in the presence of a nonsulfided hydrotreating catalyst, to produce a first product comprising hydrocarbons In various embodiments, the present invention provides a method of producing a transportation fuel. The method includes hydrotreating a feedstock comprising at least one of a renewable triacylglyceride (TAG), renewable fatty acid, renewable fatty acid $C_1$-$C_5$ alkyl ester ($C_1$-$C_5$ FAE), or a mixture thereof, in the presence of a nonsulfided hydrotreating catalyst, to produce a first product comprising hydrocarbons. The method also includes subjecting the first product to at least one process selected from aromatization, cracking, and isomerization, to produce a second hydrocarbon product selected from gasoline, naptha, kerosene, jet fuel, and diesel fuels. The renewable TAG, renewable FFA, and renewable $C_1$-$C_5$ FAE comprise fatty acid units that have an even number of carbon atoms.

Various embodiments of the present invention provide a method of producing a hydrocarbon product. The method includes hydrotreating a feedstock comprising at least one of a renewable triacylglyceride (TAG), renewable fatty acid, renewable fatty acid $C_1$-$C_5$ alkyl ester ($C_1$-$C_5$ FAE), or a mixture thereof, in the presence of a nonsulfided hydrotreating catalyst, to produce a first product comprising hydrocarbons the renewable TAG, renewable FFA, and renewable $C_1$-$C_5$ FAE comprise fatty acid units that have an even number of carbon atoms. In the first product, a proportion of hydrocarbons with an odd-number of carbon atoms, cyclic hydrocarbons, or hydrocarbons with an even-number of carbon atoms is dependent on an average temperature used during the hydrotreating.

Hydrotreating catalysts are conventionally sulfurized, and available procedures describing the use of hydrotreating catalysts describe a sulfurization pre-treatment step. Hydrotreating catalysts have generally been used to treat petroleum feedstocks that contain sulfur, and since sulfur content of the catalyst can influence various characteristics of the catalyst, conventionally the catalyst is pre-sulfurized to keep catalyst sulfur levels steady and thus help to ensure a more predictable reaction that is easier to maintain at a steady-state. By not pre-sulfurizing the hydrotreating catalyst, various embodiments of the present invention run counter to conventional teachings; further, it has unexpectedly been found that the use of a non-conventional non-sulfurized hydrotreating catalyst has certain advantages over a traditional sulfurized hydrotreating catalyst, as further described below.

Various embodiments of the present invention can provide certain advantages over other methods of generating hydrocarbons. In some embodiments, the present method can provide hydrocarbon fuels or fuel blendstocks having similar properties to petroleum-derived fuels or fuel blendstocks. In various embodiments, the present method can provide fuels or fuel blendstocks at lower cost and greater efficiency than other methods. In various embodiments, the present method can allow the use of a greater variety of biomaterials for conversion to hydrocarbons suitable for fuels or fuel blendstocks than other methods. For example, embodiments of the present invention can avoid the use of sulfur-doping in the feedstock, or can avoid the use of sulfurized catalyst. The use of a nonsulfided catalyst can allow for more efficient usage of hydrogen; therefore, in various embodiments, less total hydrogen is supplied to the hydrodeoxygenation reactor than is required by technologies employing sulfided catalysts or technologies employing sulfur-doped feedstocks. Embodiments of the present method offer advantages over methods in that the very nature of the catalyst is different, thus potentially offering the ability to operate at lower temperatures or pressures while achieving the same or superior outcome as other methods, offering for example economic advantages in large-scale production settings. In some embodiments, a nonsulfided hydrotreating catalyst allows for reduction, decarbonylation, and decarboxylation reactions to occur over a range of conditions that is broader than other methods. Various embodiments provide a method that can provide efficient reduction of fatty acids to hydrocarbons, with no or little limitation to the amount of fatty acids that can be present in the feedstock blend. In some examples, feedstock can be advantageously converted to a paraffinic product at lower temperatures and pressures than those described previously. In various embodiments, by controlling the product mixture proportion of hydrocarbon compounds having odd-numbers of carbon atoms to hydrocarbon compounds having even-numbers of carbon atoms, the range of carbon atoms in the product can be more finely controlled than other methods, in some examples more efficiently and with less energy or cost expenditure than other methods. By having greater control over the range of carbon atoms in the product, the method can produce products that more closely adhere to specifications for fuels or fuel blendstocks than those produced by other methods, more efficiently and with less energy or cost expenditure than other methods. In various embodiments, the product mixture proportion of acyclic hydrocarbons to cyclic hydrocarbons can be controlled by varying for example the temperature or catalyst. In some embodiments, the use of a nonsulfided catalyst allows the use of higher temperatures than other catalysts, which can in some examples allow the formation of more cyclic compounds at greater efficiency during the hydrotreatment step than other methods. In some embodiments, the catalyst can be varied to form a higher proportion of cyclic hydrocarbons. By forming greater proportions of cyclic compounds during the hydrotreatment step, fuels and fuel blendstocks for certain jet fuels, which can sometimes require particular distributions of cyclic hydrocarbons, can be more easily and more efficiently generated than other methods.

BRIEF DESCRIPTION OF THE FIGURES

The drawings illustrate generally, by way of example, but not by way of limitation, various embodiments discussed in the present document.

DETAILED DESCRIPTION

Definitions

Figure 1:
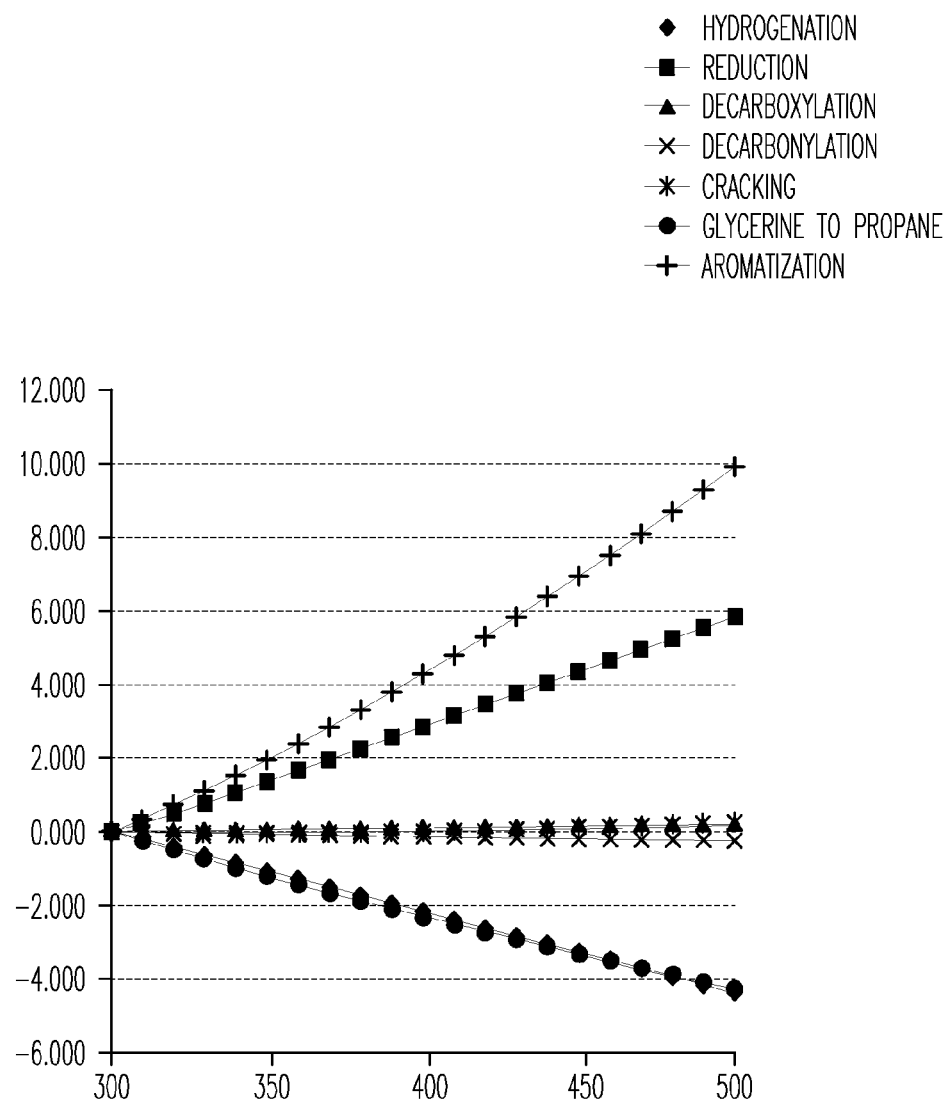
FIG. 1 illustrates change in enthalpy versus temperature, according to various embodiments.

The term "brown grease" as used herein includes waste vegetable oil, animal fat, grease, and the like, such as trap grease (e.g. grease recovered from waste water), sewage grease (e.g., from a sewage plant), and black grease. Brown grease from traps and sewage plants are typically unsuitable for use as animal feed. The term brown grease also encompasses other grease having a FFA content greater than 20% and being unsuitable for animal feed.

The term "yellow grease" as used herein includes for example used frying oils such as for example those from deep fryers. It also encompasses lower-quality grades of tallow from rendering plants.

Fatty acids can be bound or attached to other molecules, for example as esters in triacylglycerides or phospholipids. When they are not attached to other molecules, they are known as "free" fatty acids. The uncombined fatty acids or FFAs can come from the breakdown of a TAG into its components (fatty acids and glycerol). For example, a FFA can break off a TAG through hydrolysis, for example, using steam, chemicals, heat, etc. In the presence of a catalyst (e.g., acid), transesterification of TAGs with an alcohol such as methanol, ethanol, or another $C_1$-$C_5$ alcohol can provide a $C_1$-$C_5$ alkyl ester of a fatty acid, which in some examples are effective as biodiesel. The FFA in crude vegetable oils can range from about 1% to about 4% (olive oil can include up to about 20%). The amount of FFA in yellow grease (e.g., recycled cooking oil) generally ranges from about 4% to about 15%. Brown grease (e.g., trap grease) can include a FFA composition of about 50% to 100% of raw material.

Here the term "hydrotreatment" as used herein is used to refer to a catalytic process performed in the presence of hydrogen that includes reductive chemical reactions, such as for example reduction of unsaturated bonds, and reduction of carbon to lesser oxidation states via removal of bonds to oxygen or other heteroatoms, including for example carboxylate reduction, carboxylate decarboxylation, carboxylate decarbonylation, alkene reduction, reduction of conjugated or aromatic unsaturated bonds, reduction of any carbon-oxygen bond including for example conversion of glycerine to propane, or other reactions including carbon-carbon bond cracking and cycloparaffin formation via cyclization, or cycloparaffin formation via cyclization followed by hydrogenation/saturation of conjugated or non-conjugated C—C bonds, or aromatization. For example, hydrotreatment can include a catalytic process whereby oxygen is removed from organic compounds as water (hydrodeoxygenation); sulfur from organic sulfur compounds as dihydrogen sulfide (hydrodesulfurization); nitrogen from organic nitrogen compounds as ammonia (hydrodenitrogenation); and halogens, for example, chlorine from organic chloride compounds as hydrochloric acid (hydrodechlorination).

The term "normal alkanes" is used to refer to linear alkanes, such as for example n-paraffins, which do not contain carbon side chains.

The term "renewable" as used herein refers to non-petroleum derived. A feedstock can be considered renewable if it contains a proportion of materials derived from non-petroleum sources, for example about 1 wt %, 5 wt %, 10 wt %, 20 wt %, 30 wt %, 40 wt %, 50 wt %, 60 wt %, 70 wt %, 80 wt %, 90 wt %, 95 wt %, or about 99 wt % of the feedstock can include materials derived from non-petroleum sources. Likewise, a fuel can be considered renewable if it contains a proportion of hydrocarbons derived from non-petroleum sources, for example about 1 wt %, 5 wt %, 10 wt %, 20 wt %, 30 wt %, 40 wt %, 50 wt %, 60 wt %, 70 wt %, 80 wt %, 90 wt %, 95 wt %, or about 99 wt % of the fuel can include hydrocarbons derived from non-petroleum sources. Non-petroleum sources can include, for example, any biological source, such as plants, animals, or organisms such as algae.

The term "virgin" as in for example "virgin TAG" as used herein refers to feedstock material that has not been used after being derived from its source. For example, TAG-containing fats or oils derived from a plant or animal that have not been used to cook food can be considered to include virgin TAG.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999%.

The term "blendstock" as used herein refers to a composition that can be blended with any other suitable composition to form a fuel. A blendstock can form any suitable proportion of the final fuel product, for example about 1 wt %, 5 wt %, 10 wt %, 20 wt %, 30 wt %, 40 wt %, 50 wt %, 60 wt %, 70 wt %, 80 wt %, 90 wt %, 95 wt %, or about 99 wt % of the final product. In some examples, distillation can be used to form distinct blendstocks (e.g. having a particular range of hydrocarbon chain lengths or particular proportions of certain types of hydrocarbon compounds) from a product mixture, and any number of different distinct blendstocks forms from one or different products can be blended in suitable proportions to form a fuel.

Generally, psi pressures given herein are gauge pressures unless otherwise indicated.

The term "fuel" as used herein can refer to a hydrocarbon mixture, such as for example a distillate fuel, jet fuel, diesel fuel, compression ignition fuel, gasoline, spark ignition fuel, rocket fuel, marine fuel, or other fuel, qualifying as such by virtue of having a set of chemical and physical properties that comply with requirements delineated in a specification developed and published by ASTM (American Society of Testing and Materials), European Standards Organization (CEN), and/or the U.S. Military. In some examples, a fuel can be a liquid transportation fuel, for example, for surface or air transport. Surface transport includes both terra firma and oceanic transport. Fuels of this type are included, but not limited to, ASTM specifications D975 (Diesel Fuel Oil), D1655 (Aviation Turbine Fuels), D4814 (Automotive Spark Ignition Fuel); military specifications MIL-DTL-83133G (Turbine Fuel, Aviation, Kerosene Type), MIL-DTL-25576D (Propellant, Rocket Grade Kerosene), MIL-DTL-38219D (Turbine Fuel, Low Volatility), MIL-DTL-5624U (Turbine Fuel, Aviation), MIL-DTL-16884L (Fuel, Naval Distillate), and other such specifications for similar fuels.

The term "$C_1$-$C_5$ FAE" or "fatty acid $C_1$-$C_5$ alkyl ester" designates a fatty acid in the form of an ester with a $C_1$-$C_5$ normal or branched alkyl group bound to the non-carbonyl oxygen atom of the carboxyl-group. In some examples, the $C_1$-$C_5$ FAE is fatty acid methyl ester (FAME). In some examples, the $C_1$-$C_5$ FAE is a fatty acid ethyl ester (FAEE).

I. Overview

In various embodiments, the present invention provides a method or process by which renewable feedstocks can be converted to gasoline, kerosene, jet fuels, and diesel fractions. Feedstocks can include at least one of renewable TAG, renewable FFA, and renewable $C_1$-$C_5$ FAE. According to some examples, feedstocks are converted to a product including paraffinic hydrocarbons without presulfiding of a hydrotreating catalyst and without the feedstock being doped with sulfur. In embodiments, feedstocks are converted to a product including paraffinic hydrocarbons whereby the hydrocarbon chain length distribution is similar to that of petroleum-derived fuels. Control of the process can be achieved by allowing for simultaneous hydrotreating reactions to occur, such as for example reduction, decarbonylation, and decarboxylation reactions. Control parameters during the reaction can include, for example, the temperature, pressure, and the use of a non-sulfided hydrotreating catalyst.

The nonsulfided hydrotreating catalyst allows for hydrotreatment chemical reactions to run simultaneously over a range of conditions. In the hydrotreating, the feedstock is reacted with hydrogen in the presence of the catalyst at a variety of temperature, pressure, and space velocity conditions, and is generally converted to hydrocarbons. In some examples, the method allows the feedstock to be advantageously converted to a paraffinic product at lower temperatures and pressures than those described previously. In some examples, the first product can be used directly or with minimal processing to provide fuels or fuel blendstocks. In some embodiments, the paraffinic (first) product with minimal or no processing can further undergo additional chemical processing steps, such as for example isomerization, selective cracking, or aromatization steps, to provide a second product that includes fuels or fuel blendstocks. In some examples, distinct blendstocks can be provided via distillation of the second product. In some examples, the second product is suitable for use as a fuel or blendstock with minimal or substantially no processing.

In various embodiments, the product formed by the hydrotreatment can include for example normal alkanes, saturated hydrocarbons, aromatic hydrocarbons, or any combination thereof, and can have any suitable proportions of these components. In some examples, any suitable amount of overlap can occur between normal alkanes and saturated hydrocarbons, for example any suitable proportion of the normal alkanes can be saturated hydrocarbons, and any suitable proportion of the normal alkanes can have any suitable degree of unsaturation. In some embodiments, the proportion of normal alkanes, saturated hydrocarbons, and aromatic hydrocarbons can be controlled to various degrees by varying particular process variables, for example by suitably varying the temperature and pressure conditions, as further described herein.

When suitably blended, the blendstocks from the first or second product can become drop-in-compatible and fit-for-purpose fuels. The fuels that can be directly produced or for which blendstocks can be provided by the first or second product can include gasoline, naphtha, kerosene, jet, or diesel fuels. Additionally, hydrocarbons produced by the process can be utilized for the production of chemicals, including those useful as feedstocks for the production of polymers, such as polyethylene and polypropylene. In examples of the method including a hydrotreatment, or in examples including both hydrotreatment and followed by additional transformative steps, the product fuels can have chemical compositions similar to the hydrocarbons and can be fully fungible with petroleum-derived fuels. That is, the fuels produced can be identical in virtually all respects to commercially available petroleum-derived fuels. Advantageously, the first or second product, in some embodiments with little or no further processing, can be better suited for use as a fuel or fuel blendstock than other methods, having hydrocarbon chain length ranges or product distributions better suited for fuel or fuel blendstock use than those produced by other methods, and being produced with less consumption of energy or valuable materials than other methods.

Feedstock

According to some examples in this disclosure, a feedstock including at least one of TAG, FFA, or $C_1$-$C_5$ FAE is hydrotreated. The TAG can be obtained from terrestrial or marine sources. The TAG can include triacylglycerides derived from any suitable renewable source, including for example triacylglycerides derived from plants, triacylglycerides derived from animals, triacylglycerides derived from algae, or combinations thereof. The feedstock can further include diacylglycerides, monoacylglycerides, FFAs, or $C_1$-$C_5$ FAE and combinations thereof. The feedstock can include yellow grease, brown grease, or a combination thereof. The feedstock can include a blend of fresh (e.g. virgin) TAG and used TAG (e.g., yellow grease or brown grease). According to some examples in this disclosure, the feedstock is not doped with sulfur. The ratio of the virgin and used TAG in the composition of a TAG-containing feedstock can be selected such that hydrotreating produces a desired hydrocarbon product composition.

Fatty acids can be obtained from any suitable source. In some examples, fatty acids can be obtained from TAG. In some examples, fatty acids can be obtained from commercial sources, such as fatty acids marketed as products intended for a variety of uses, including cosmetics, or such as fatty acids from waste recovery operations. The quality of the fatty acid to be used in the process, as with any component of the feedstock, can be any suitable quality, and can vary widely. The process is robust enough to accommodate fatty acids possessing varying types of impurities, including water. In various examples, the purity of the fatty acids utilized prior to formation of the feedstock can be about 60 wt % to 100 wt %, or about 70 wt % to about 95 wt %, or about 88 wt %. The purity of the fatty acid or any other component of the feedstock can be any suitable purity such that acceptable results are achieved, e.g. such that the method provides hydrocarbons with acceptable quality for use as transportation fuel or fuel blendstock. Mixtures can possess any suitable acid number or saponification value. In some examples, the acid number or saponification value can be about 0.1 mg KOH/g to about 500, or about 10 to about 400, or about 50 to about 350, or about 100 to about 300, or about 150 to about 250, or about 190 to about 210 mg KOH/g. In one example, fatty acids suitable for use in the process can have an acid number of about 201 mg KOH/g and a saponification number of about 203 mg KOH/g.

$C_1$-$C_5$ FAE can be obtained from any suitable source. In some examples, $C_1$-$C_5$ FAE is obtained via transesterification of TAG, or via esterification of FFA. In some examples, $C_1$-$C_5$ FAE can be obtained from commercial sources. In some examples, the $C_1$-$C_5$ FAE can include B99 biodiesel.

In some embodiments, the feedstock can include predominantly TAGs with little or no FFAs or $C_1$-$C_5$ FAEs. In some embodiments, the feedstock can include TAGs and fatty acids. In some embodiments, the feedstock can include TAGs and $C_1$-$C_5$ FAEs. In some embodiments, the feedstock can include fatty acids and $C_1$-$C_5$ FAEs. In various embodiments, the feedstock can include TAGs, $C_1$-$C_5$ FAEs, and fatty acids. In some embodiments, the feedstock can include fatty acids with substantially little or no TAGs or substantially little or no $C_1$-$C_5$ FAEs. In some embodiments, the feedstock can include $C_1$-$C_5$ FAEs with substantially little or no TAGs or substantially little or no FFAs. In some embodiments, the feedstock can include $C_1$-$C_5$ FAEs and fatty acids in any suitable proportion with substantially little or no TAGs.

Feedstock can be Predominantly Fatty Acids, Fatty Acid Esters, or a Suitable Combination Thereof In various embodiments, the method can convert a feedstock including predominantly fatty acids (e.g. substantially no TAGs or $C_1$-$C_5$ FAEs) to a mixture of hydrocarbons. In various embodiments, the method can produce predominantly normal paraffins (e.g. about 51 wt % to about 95 wt %, or about 65 wt % to about 85 wt %, or about 70 wt % to about 80 wt %, or about 76 wt %) and iso-paraffins (e.g. about 1 wt % to about 40 wt %, or about 5 wt % to about 30 wt %, or about 10 wt % to about 20 wt %, or about 15 wt %) as well as small amounts of cycloparaffins (e.g. less than about 10 wt %, or less than about 5 wt %, or less than about 1 wt %, or about 0 wt %), and olefins (e.g. less than about 15%, or less than about 10%, or less than about 5%, or about 3% or less, or less than 1%). In some examples, processing of feedstocks including predominantly fatty acid ester (e.g. substantially no TAGs or $C_1$-$C_5$ FAEs) can produce similar results. In some embodiments, processing of feedstocks including predominantly fatty acids and fatty acid esters in any suitable proportion (e.g. substantially no TAGs) can produce similar results.

The product mixture resulting from hydrotreatment of a feedstock including fatty acids, $C_1$-$C_5$ FAEs, or a suitable mixture thereof, can have small amounts of fatty acids or fatty acid esters. For example, less than about 10 wt %, 5 wt %, 1%, 0.5%, 0.1%, 0.01 wt %, 0.001 wt %, or less than about 0.0001 wt % fatty acids or fatty acid esters. In some examples, the amount of fatty acid present can be detected by acid-base titration techniques, as a readily understood by one of skill in the art. In some examples, the residual fatty acid can be present in an amount such that less than about 5 mg KOH/g hydrocarbon, 1 mg, 0.5 mg, 0.3 mg, 0.2 mg, 0.1 mg, 0.01 mg, or less than about 0.001 mg KOH consumed per gram of hydrocarbon present.

Catalyst

The feedstock is hydrotreated using a hydrotreating catalyst that is not presulfided. The hydrotreating catalyst can be any nonsulfided hydrotreating catalyst. In embodiments, the hydrotreating catalyst is a nonsulfided hydrogenation catalyst. The hydrotreating catalyst can include one or more metals from Groups 6, 8, 9, and 10 of the periodic table of the elements. In some examples, the one or more metals can be selected from palladium (Pd), platinum (Pt), nickel (Ni), and combinations thereof. In embodiments, the catalyst is a nickel-molybdenum (NiMo) catalyst including nickel and molybdenum. In some embodiments, the catalyst is a cobalt-molybdenum (CoMo) catalyst. The hydrotreating catalyst can include supported or unsupported metals. In various embodiments, the catalyst includes a support. In applications, the support includes alumina, silica, or a combination thereof. The catalyst can be a supported NiMo or CoMo catalyst. In embodiments, $NiMo/Al_2O_3$—$SiO_2$ or $CoMo/Al_2O_3$ catalyst is utilized. In some embodiments, a Ni catalyst is utilized. In some embodiments, a molybdenum catalyst is utilized. In some embodiments, a catalyst with any suitable proportion of Ni and Mo is utilized.

Catalysts having any suitable type or combination of active sites or structures can be used as the hydrotreating catalyst. In various examples, catalysts with type I active sites or structures can be utilized; in other examples, catalysts without type II active sites or structures can be utilized. In various examples, catalysts with type II active sites or structures can be utilized; in other examples, catalysts without type II active sites or structures can be utilized.

The use of a nonsulfided catalyst allows for more efficient usage of hydrogen; therefore, less total hydrogen can be supplied to the hydrodeoxygenation reactor than is required by technologies employing sulfided catalysts.

General Hydrotreatment Conditions

Reactor temperature parameters can vary between about 150° C. and about 800° C., or about 250° C. to about 600° C., or about 300° C. to about 550° C., or about 340° C. to about 530° C. Reactor pressures can vary between about 100 psi to about 1000 psi, or about 200 psi and about 750 psi. In some embodiments, reactor pressures can vary between about 500 psi and about 1000 psi, while in some embodiments, reactor pressures can vary between about 100 psi and about 500 psi. Hydrogen flow rates can vary between about 2.5 standard cubic feet per liter and about 50 standard cubic feet per liter of TAG, FFAs, and $C_1$-$C_5$ FAEs, or about 15-20 standard cubic feet per liter. Liquid hourly space velocities (LHSV) can vary between about 0.1 reactor volumes/hr (e.g. $hr^{-1}$) and 8 $hr^{-1}$, about 0.5 $hr^{-1}$ and about 4 $hr^{-1}$, or between about 0.8 $hr^{-1}$ and about 1.2 $hr^{-1}$ being most preferred.

II. First Product Including Predominantly Normal Alkanes

In various embodiments, a product including predominantly normal alkanes is produced via the hydrotreating step. In some embodiments, the product including predominantly normal alkanes can include aromatic hydrocarbons along with saturated hydrocarbons. The product including predominantly normal alkanes can overlap with the product described below including aromatic hydrocarbons along with saturated hydrocarbons to any degree. For example, any proportion of the normal alkanes in such a product mixture can be saturated hydrocarbons, such as more than about 95 wt %, 90 wt %, 80 wt %, 70 wt %, 60 wt %, 50 wt %, 40 wt %, 30 wt %, 20 wt %, or more than about 10 wt % of the product mixture. In other embodiments, less than about 10 wt %, 5 wt %, or less than about 1 wt % of the normal alkanes can be saturated hydrocarbons.

In embodiments, the hydrotreating of the feedstock can be performed at modest temperatures and pressures (relative to other methods). In various embodiments, the temperature is in the range of about 340° to about 410° C. In some embodiments, the temperature is in the range of about 390° to about 410° C. In some embodiments, the temperature is about 400° C. Preferred pressures in such applications are in the range of about 100 psig to 200 psig. In some embodiments, the pressure is in the range of about 150 psig to about 200 psig. In embodiments, the temperature is about 400° C., and the pressure is about 200 psig. Suitable pressures can include pressures that are below that typically employed in processes utilizing sulfided hydrotreating catalysts. In some embodiments, the hydrotreating of the feedstock can be performed at any suitable temperature and pressure, such as any temperature or pressure given in the present paragraph, or any temperature or pressure between the ranges given in the present paragraph and the ranges given in the section below for first products including saturated hydrocarbons and aromatic hydrocarbons.

The paraffinic hydrocarbon product produced in this manner can include predominantly normal alkanes. The product can include, for example, more than about 50 wt % normal alkanes, more than 60 wt % normal alkanes, more than 70 wt % normal alkanes, or about 75 wt % normal alkanes, or more than about 80 wt % normal alkanes, or more than about 90 wt % normal alkanes. The product can further include normal alkenes. In some examples, the product can include about 1 wt % normal alkenes, 3 wt %, 5 wt %, 7 wt %, 10 wt %, 13 wt %, 15 wt %, 17 wt % or about 20 wt % normal alkenes. In some embodiments, the paraffinic product can further include a trace of fatty acid or no fatty acid, such as for example not more than 0.001 wt %, 0.01 wt %, 0.1 wt %, 1 wt %, 2 wt %, or not more than 5 wt %. This outcome can be achievable including through the use of the nonsulfided hydrotreating catalyst, thus providing excellent conversion of feedstock to paraffinic product. The paraffinic product can be convertible to liquid transportation fuels by standard petroleum-refining and processing methods. For example, the paraffinic product can further undergo further chemical processing such as for example isomerization, cracking, or aromatization steps to provide transportation fuels or fuel blendstocks.

III. First Product Including Saturated and Aromatic Hydrocarbons

In various embodiments, higher pressures can be utilized during the hydrotreating step, producing a product including aromatic hydrocarbons along with saturated hydrocarbons. A product mixture including aromatic hydrocarbons along with saturated hydrocarbons can overlap with the product distribution described above for products containing predominantly normal alkanes to any suitable degree. For example, the product including aromatic hydrocarbons along with saturated hydrocarbons includes predominantly normal alkanes, or more than about 95 wt %, 90 wt %, 80 wt %, 70 wt %, 60 wt %, 50 wt %, 40 wt %, 30 wt %, 20 wt %, or more than about 10 wt % normal alkanes. In other embodiments, the product including aromatic hydrocarbons can include less than about 10 wt %, 5 wt %, or less than about 1% normal alkanes. The operating temperature for such embodiments can be in the range of about 470° C. to 530° C. In some embodiments, the temperature is in the range of about 480° C. to 500° C. In some embodiments, the temperature is about 480° C. The operating pressure can be in the range of about 650 psig to about 1000 psig. In some embodiments, the hydrotreating pressure can be in the range of about 700 psig to 800 psig. In some applications, the pressure is about 750 psig. In some applications, the temperature is about 480° C., and the pressure is about 750 psig. In some embodiments, the hydrotreating of the feedstock can be performed at any suitable temperature and pressure, such as any temperature or pressure given in the present paragraph, or any temperature or pressure between the ranges given in the present paragraph and the ranges given in the section above for first products including predominantly normal alkanes. One of skill in the art will readily appreciate that by varying the temperature and pressure conditions between those given in the present paragraph and those given in the section above for first products including predominantly normal alkanes, the proportion of normal alkanes, saturated hydrocarbons, and aromatic hydrocarbons can be accordingly controlled or adjusted.

In some embodiments, the feedstock is converted to a product including predominantly saturated hydrocarbons and aromatic hydrocarbons. The saturated/aromatic hydrocarbon product produced in this manner can include predominantly saturated hydrocarbons. The product can include more than about 50 wt % saturated hydrocarbons, 55 wt %, 60 wt %, 65 wt %, 70 wt %, 75 wt %, 80 wt %, 85 wt %, or more than about 90 wt % saturated hydrocarbons. The saturated/aromatic hydrocarbon product can include more than about 5 wt % aromatic hydrocarbons, 10 wt %, 15 wt %, 20 wt %, 25 wt %, 30 wt %, 35 wt %, or more than about 40 wt % aromatic hydrocarbons. In embodiments, the saturated/aromatic product further includes alkene hydrocarbons. The product can include less than about 30 wt % normal alkenes, 25 wt %, 20 wt %, 15 wt %, 10 wt %, 5 wt %, 3 wt %, or less than about 1 wt % normal alkenes.

The composition of the feedstock can be selected such that the ratios of saturated hydrocarbons to aromatic hydrocarbons to olefinic hydrocarbons are suited to the production of a desired fuel or fuel blendstock. For example, such a saturated/aromatic product can be useful in the production of jet fuel, with minimal secondary processing being required. In examples, secondary processing can include standard petroleum-refining and processing methods. The amount of aromatic hydrocarbon in the saturated/aromatic product can also be modulated by adjusting the temperature. It should be noted that various embodiments offer a direct and economical path for the production of liquid transportation fuels, especially jet fuel, which require minimal secondary processing.

IV. Optional Second Step—Isomerization to Form ISO-Alkanes

In some embodiments, the first product is suitable for use as a fuel or fuel blendstock with little or no processing. In various embodiments, the first product can be subjected to optional further chemically transformative steps such as such as for example isomerization, selective cracking, or aromatization steps; e.g. in some embodiments further chemical transformative steps are performed, while in other embodiments further chemical transformative steps are not performed. In various embodiments of the present invention, the first product can be subjected to an optional isomerization step; e.g. in some embodiments an isomerization step is performed, while in other embodiments an isomerization step is not performed. In examples, any first product described herein can be subjected to the isomerization step. The isomerization step can be performed directly on the first product, or can be performed on the first product after any suitable degree of processing of the first product. In some embodiments the product that results from the isomerization (the second product) can be suitable for use as a fuel or fuel blendstock with little or no processing, while in other embodiments the second product can be subjected to any suitable degree of processing prior to being suitable for use as a fuel or fuel blendstock.

In some embodiments, performing optional reactive steps can produce a second product that is more suitable as a fuel or blendstock than the product of the first step. In some examples, the product of the second step can be advantageously suited for easy use as a fuel or fuel blendstock with minimal or no further treatment needed. Advantageously, the second product can be better suited for use as a fuel or fuel blendstock than other methods, having hydrocarbon chain length ranges or product distributions better suited for fuel or fuel blendstock use than those produced by other methods, and being produced with less consumption of energy or valuable materials than other methods.

In some examples, the isomerization step can include a dewatering step. The dewatering step can include removal of water from the starting material for the isomerization step. The dewatering step can include any suitable procedure that removes a suitable amount of water from the hydrocarbon starting material. In some examples, the dewatering step can include cooling the hydrocarbon mixture to any suitable temperature, for example the hydrocarbon mixture can be cooled to ambient temperature (e.g. 20° C.-30° C.). The dewatering step can include allowing the less polar hydrocarbon-containing phase to separate from a more polar water-containing phase. The water-containing phase can then be physically separated from the hydrocarbon-containing phase. In some examples, the hydrocarbon can be placed in contact with molecular sieves, for instance 4-Å molecular sieves, which can further remove water. Generally, for larger amounts of water, a phase separation can be performed first, then a second step contacting with molecular sieves.

In some examples, the isomerization step can include a deacidification step. The deacidification step can include removal of acid from the starting material for the isomerization step. Any suitable method of acid removal can be used for the deacidification step. In one example, removal of the water-containing phase during a dewatering step can substantially remove the acid, due to preference of the acid to reside in the more polar water-containing phase, advantageously combining dewatering with deacidification. In some examples, treatment of the undewatered or dewatered hydrocarbons with a basic material can allow for deacidification. In some embodiments, contacting the hydrocarbons with molecular sieves can further deacidify the hydrocarbons, due to basic properties of certain molecular sieves, advantageously combining dewatering with deacidification.

The isomerization step includes isomerizing the hydrocarbon. Any suitable proportion of the hydrocarbon can be isomerized in the isomerization step. For example, about 1 wt %, 5 wt %, 10 wt %, 20 wt %, 30 wt %, 40 wt %, 50 wt %, 60 wt %, 70 wt %, 80 wt %, 90 wt % or about 95 wt % of the hydrocarbon can be isomerized. The isomerization step can include contacting hydrocarbon with an isomerization catalyst. For example, the isomerization step can include passing a dried deacidified hydrocarbon over a bed of isomerization catalyst. In some examples, multiple contactings, or passes, can be performed to elicit a desired proportion of isomerization of the hydrocarbon. In some example, each contacting or pass provides about 1 wt %, 5 wt %, 10 wt %, 20 wt %, 30 wt %, 40 wt %, 50 wt %, or about 60 wt % isomerization of the hydrocarbon. Any suitable number of contacting or passes can be conducted, for example 1, 2, 3, 4, 5, 6, or 7 contactings or passes can be conducted.

Any suitable isomerization catalyst can be used to effect the isomerization. For example, catalysts which possess a suitable balance of catalytic metal dehydrogenation/hydrogenation activity and support acidity can be used. Support acidity can be a controlling feature, along with operational temperature, which can determine the amount of carbon chain cracking that will occur. Strongly acidic supports can result in greater amounts of chain cracking at a given temperature than a weakly acidic support at the same temperature. Support acidity can be controlled by the silica-alumina ratio in the support. Additionally, the silica-alumina ratio in the support can control the pore size of the support. Pore size can also control cracking to a certain degree, again based upon operational temperature. Isomerization catalysts with strong dehydrogenation/hydrogenation activity and weak support acidity may find greater utility in the production of diesel fuel fractions. Isomerization catalysts with moderate acidity and strong dehydrogenation/hydrogenation activity may find greater utility in the production of jet fuel fractions. Isomerization catalysts with strong acidity may find greater utility in production of naphtha fractions. Suitable isomerization catalysts include any suitable isomerization catalyst known to one of skill in the art, such as those having two or more catalytic metals and a silica-alumina support, wherein the metals and support can be present in any suitable proportion.

Any suitable temperature can be used during the isomerization. For example, operation of an isomerization catalyst at a moderately low temperature, such as about 280° C.-about 380° C. or about 320° C.-about 340° C., may find utility in the production of diesel fuel, especially low-cloud point diesel fuel. Operation of an isomerization catalyst at moderate temperature may find utility in the production or jet fuel. Operation of an isomerization catalyst at high temperature, such as about 320° C.-about 420° C. or about 360° C.-about 380° C., may find utility in the production of naphtha and gasoline-blendstock fuels. Suitable temperature ranges can include, for example, about 100° C.-500° C.

Any suitable pressure can be used during the isomerization. For example, operation of an isomerization catalyst at high hydrogen pressure, such as about 600 psig-900 psig or about 700 psig-800 psig, may suppress the dehydrogenation activity of the catalyst, resulting in only slight isomerization, but potentially significant cracking. Operation of an isomerization catalyst at moderate hydrogen pressure, such as about 250 psig-about 700 psig, may provide high isomerization with only slight cracking Operation of an isomerization catalyst at low hydrogen pressure, such as about 150 psig-about 250 psig, may suppress the hydrogenation activity of the catalyst, resulting in significant cracking as well as alkene production. Suitable hydrogen pressures can include about 100 psig-about 900 psig.

Any suitable liquid flow rate can be used during the isomerization. For example, a liquid flow rate of about 0.1 to about 20 reactor volumes per hour or about 0.5-about 10 reactor volumes per hour can be a suitable flow rate.

In some embodiments the product that results from the isomerization (the second product) can be suitable for use as a fuel or fuel blendstock with little or no processing, while in other embodiments the second product can be subjected to any suitable degree of processing prior to being suitable for use as a fuel or fuel blendstock. The processing, if performed, can include any suitable processing. The processing can include distillation. In some examples, distillation of the isomerized mixture can provide fuels or fuel blendstocks useful in spark ignition or compression ignition engines. The blending of appropriate distillate fractions with appropriate petroleum-derived aromatic hydrocarbons and mixtures of aromatic hydrocarbons, can provide a renewable petroleum blend of hydrocarbons that complies with various jet fuel specifications, such as for example a U.S. military specification for jet fuel, such as MIL-DTL-83133F.

V. Control Over the Proportion of Hydrocarbon Compounds Having an Odd-Number of Carbons, Hydrocarbon Compounds Having an Even-Number of Carbons, and Cyclic Hydrocarbons In various embodiments, during the hydrotreatment of the feedstock, variation of temperature, variation of the catalyst, or both, can cause the proportion of hydrocarbons in the product composition having an odd-number of carbon atoms in the product composition having an even-number of carbon atoms to vary in a controllable fashion. In various embodiments, during the hydrotreatment of the feedstock, variation of temperature, variation of the catalyst, or both, can cause the proportion of hydrocarbons in the product composition that are cyclic versus hydrocarbons in the product composition that are acyclic to vary in a controllable fashion. By allowing control over the proportion of odd versus even carbon atom-containing hydrocarbons in the product, and cyclic versus acyclic hydrocarbons in the product, the range of hydrocarbon chain lengths can be more precisely controlled, and the amount of cyclic hydrocarbons in the product can be more precisely controlled, advantageously allowing the production of fuels or fuel blendstocks with no or minimal processing with greater efficiency and less use of financial or energy resources than other methods. Such control can be effected when using any suitable feedstock as described herein, including at least one of renewable TAGs, renewable FFAs, or renewable $C_1$-$C_5$ FAEs.

Renewable TAGs have fatty acid portions that possess even numbers of carbons. The renewable TAG, renewable FFA, and renewable $C_1$-$C_5$ FAE of the feedstock of the present invention can have fatty acid portions that have predominantly even numbers of carbon atoms, for example greater than about 60 mol %, 70 mol %, 80 mol %, 90 mol %, 95 mol %, 96 mol %, 97 mol %, 98 mol %, 99 mol %, 99.5% mol % or about 100 mol % of the fatty acids portions have even numbers of carbon atoms. During hydrotreatment a combination of reactions can occur, as described herein. Some of the reactions that can occur do not result in the loss of any carbon atoms, while other reactions result in the loss of carbon atoms. In some examples, the reactions that cause loss of carbon atoms can result in the loss of an odd number of carbon atoms, such as one carbon atom. Likewise, some reactions result in cyclization, while others do not. Not intending to limit the method of the present invention to any mechanism or theory of operation, by varying the temperature or catalyst used in the hydrotreatment, the rates of one of more of the reactions can be varied such that either reactions that conserve carbon within the chain can predominate, or reactions that occur with release of carbon from the chain can predominate. Likewise, by varying the temperature or catalyst used in the hydrotreatment, the rate of one or more of the reactions can be varied such that either reaction that do not result in the cyclization of compounds predominate, or reactions that do result in the cyclization of compound predominate. By controlling which types of reactions predominate, the distribution within the product mixture of hydrocarbons with an odd-number of carbon atoms versus hydrocarbons with an even-number of carbon atoms can be controlled, and likewise the amount of cyclic hydrocarbons in the product mixture can be controlled.

The Effect of Temperature on the Variation of Products

When operating a hydrotreatment process for the conversion of feedstock to hydrocarbons, a number of reactions occurring simultaneously can give rise to the observed products. Heat is generated or consumed by the various reactions that occur. Each particular chemical reaction has its own enthalpy of reaction. Additionally, in some examples, the rate of some reactions may be someone dependant on the rates of other reactions. For example, since some reactions can share a particular starting material and scarcity of that material due to a high rate of one reaction can starve the other reaction. In another example, the product of one reaction can act as starting material for another reaction, such that if one reaction generates large amounts of starting material for another reaction, the other reaction can occur at a higher rate. The observed overall heat of reaction is a mathematical sum of individual enthalpies based upon the extent of which each reaction contributes to the products produced.

Some examples of models of the various reactions that can occur during hydrotreatment are shown in Table 1. The reactions shown in Table 1 focus on the conversion of one particular example species that may or may not be in an actual feedstock in an embodiment of the present invention to one particular example product species that may or may not be in an actual first product mixture in an embodiment of the present invention. The reactions are selected to show the approximate average enthalpy contribution from each of several different types of reactions that can occur during hydrotreatment. The enthalpies given in Table 1 are non-limiting, and embodiments of the present invention may have reactions with enthalpies different than or similar to the enthalpies shown in Table 1. The enthalpies shown in Table 1 are the calculated enthalpy of reaction at 350° C. and are approximate.

cates glycerine, $C_3H_8$(PPEg) indicates propane, $C_{16}H_{26}$ (DCBg) indicates decylbenzene.

Reactions associated with negative enthalpies are reactions that release heat as they occur, while those with positive enthalpies are reactions that consume heat as they occur. Therefore, in Table 1, the greatest heat releasing reaction on a molar basis is the alkene reduction reaction, and the greatest heat consuming reaction is aromatic compound formation reaction.

The enthalpies of the hydrotreatment reactions can change as a result of changes in temperature. The result can be that some reactions can generate more or less heat as the temperature of the reaction system increases, while other reactions can absorb more or less heat as the temperature of the reaction system increases. Some reactions may not change significantly as the temperature of the reaction system changes. FIG. 1 illustrates the calculated changes in enthalpy for the various reactions shown in Table 1 for the temperate range of 300° C. to 500° C. The amount of change shown is based upon the reaction enthalpy at 300° C. (e.g. at T=300° C., change is zero).

In the model, the rates of each of the reactions shown in Table 1 can affect one another based competition between the reactions for various starting materials or physical locations, for example for hydrogen molecules or discrete catalytic sites, if either or both are required. The rate of each reaction determine to what extent each reaction contributes to the products formed in the process. Similarly to enthalpies, the relative rates can increase or decrease relative to one another with changes in reaction system temperature. This can mean that as a heat releasing reaction increases the temperature of the reaction mixture, other reactions can in some examples increase in relative rate to either release more or less heat or consume more or less heat, thereby either increasing the temperature of the reaction mixture via exothermic processes, or decreasing the temperature of the reaction mixture via endothermic processes.

In certain embodiments of the present invention, with the use of a higher temperature during hydrotreatment, while keeping hydrogen feed rate constant and feedstock feed rate constant, the proportion of hydrocarbons having an odd-number of carbon atoms and hydrocarbons that are aromatic products increases relative to hydrocarbons having an even-number of carbon atoms. Embodiments can have any suitable

TABLE 1

Individual Reactions and Associated Enthalpies at 350° C.

| Reaction | Enthalpy @ 350 °C. |
|---|---|
| Carboxylate Reduction: $C_{18}H_{36}O_2$(ODA) + $3H_2$(g) = $C_{18}H_{38}$ + $2H_2O$ | −39.094 kcal/mole |
| Carboxylate Decarbonylation: $C_{18}H_{36}O_2$(ODA) + $H_2$(g) = $C_{17}H_{36}$(HDA) + CO(g) + $H_2O$(g) | 14.782 kcal/mole |
| Carboxylate Decarboxylation: $C_{18}H_{36}O_2$(ODA) = $C_{17}H_{36}$(HDA) + $CO_2$(g) | 5.522 kcal/mole |
| Alkene Reduction: $C_{18}H_{34}$(1ODYg) + $2H_2$(g) = $C_{18}H_{38}$(ODA) | −51.002 kcal/mole |
| C-C Bond Cracking: $C_{17}H_{36}$(HDAl) + $H_2$(g) = $C_{15}H_{32}$(PDAl) + $C_2H_6$(g) | −9.259 kcal/mole |
| Glycerine Production to Propane: $C_3H_8O_3$(GLYl) + $3H_2$(g) = $C_3H_8$(PPEg) + $3H_2O$(g) | −47.118 kcal/mole |
| Aromatic Compound Formation: $C_{16}H_{34}$(HDAl) = $C_{16}H_{26}$(DCBg) + $4H_2$(g) | 81.307 kcal/mole |

In Table 1, $C_{18}H_{36}O_2$(ODA) indicates octadecanoic acid, $C_{17}H_{36}$(HDA) indicates heptadecane, $C_{18}H_{34}$(1ODYg) indicates octadecadiene, $C_{17}H_{36}$(HDA1) indicates heptadecane, $C_{15}H_{32}$(PDA1) indicates pentadecane, $C_3H_8O_3$(GLY1) indivariation in hydrogen feed rate and feedstock feed rate; but they can be held constant to aid in understanding perturbation of reaction kinetics via temperature or catalyst variation. Not intending to limit the method to any mechanism or theory of operation, as the temperature increases during hydrotreatment, the rate of hydrogen consumption can increase for the reactions involving reduction of the carboxyl group and reduction of carbon-carbon double bonds. The increase in hydrogen consumption rate can lead to scarcities of hydrogen in the vicinity of catalytic sites. With a shortage of hydrogen, reactions which require less hydrogen, or in some examples reactions that actually produce hydrogen, can become relatively favored over the reactions that consume hydrogen. The result can be an increase in relative rates of the less hydrogen consumptive reactions due to reaction system demands for hydrogen. If the particular less hydrogen consumptive reactions that occur in a greater proportion as the temperature increases are reactions that remove odd numbers of carbon atoms from the starting material, then in the product composition hydrocarbons having an odd number of carbon atoms begin to increase in proportion compared to the amount of hydrocarbons having an even number of carbon atoms. When the temperature decreases and hydrogen becomes more plentiful due to decreasing reaction rates of hydrogen consumptive reactions, if the hydrogen consumptive reactions are reactions that don't remove carbon atoms or that remove even numbers of carbon atoms, then the proportion of hydrocarbons in the product mixture that have even numbers of carbon atoms will increase compared to the amount of hydrocarbons have an odd number of carbon atoms.

Advantageously, as the temperature increases, the increase in the less hydrogen consumptive processes can result in an overall lower heat generated by the reaction system as compared to the heat that would be generated by the more highly hydrogen consumptive processes. Therefore as the temperature of the reaction system increases, reactions which produce less heat, or consume heat occur at faster relative rates than they did at lower temperatures, thereby limiting the heat produced by the reaction system. This series of phenomena can lead to a self-regulating temperature effect in the reaction system, beneficially limiting the propensity of the reaction system to suffer from an exothermic run-away reaction. This can be a significant benefit to the present method employing a nonsulfided catalyst.

Part II: Catalytic Factors

In some examples, by varying the catalyst used during the hydrotreating step, the proportion of hydrocarbons having odd versus even numbers of carbon atoms can be varied, and the overall amount of cyclic hydrocarbons produced can be varied.

For example, catalyst can be used that has variations in the proportion of nickel or molybdenum. Any suitable variation can be used. The percentages given in this paragraph are weight percents based on the total weight of nickel and molybdenum and exclusive of any binder or support of any other component of the catalyst. For example, the catalyst can be 100% nickel or 100% molybdenum. In some examples, the catalyst can be about 1% nickel with the remainder molybdenum, or about 2% nickel, or 3%, 4%, 5%, 10%, 20%, 30%, 40%, 50%, 60%, 70%, 80%, 90%, 95%, 96%, 97%, 98%, or about 99% nickel with the remainder molybdenum.

Use of a catalyst that is entirely molybdenum or that has some proportion of molybdenum can result in formation of iso-paraffins as well as normal-paraffins, and can result in formation of paraffins resulting from cracking processes.

Use of a catalyst that is entirely nickel or that has some proportion of nickel can result in less formation of iso-paraffins, and less formation of products arising from cracking processes, as compared to the use of a molybdenum catalyst. However, use of a nickel-containing catalyst can result in a tendency toward production of odd-carbon chain hydrocarbons, arising from for example decarbonylation or decarboxylation reactions, versus the molybdenum-only catalyst. As discussed herein, a greater tendency toward decarbonylation or decarboxylation can lead to a significant difference in the heat generated during a hydrotreatment reaction. Additionally, lower temperatures can advantageously lead to less hydrogen consumption. The use of a nickel-only, predominantly nickel, or nickel containing catalyst can allow the use of a reactor design that can use less heat management precautions as compared to a hydrotreatment reactor used with a catalyst having less nickel such as a nickel-molybdenum catalyst with predominantly molybdenum, or a molybdenum-only catalyst. Due to potentially less hydrogen consumption, the use of a nickel-only catalyst, predominantly nickel catalyst, or nickel-containing catalyst can lead to reduced hydrogen consumption. As a result, a stand-alone renewable fuel refinery using a nickel-only catalyst, predominantly nickel catalyst, or nickel-containing catalyst can in some embodiments require less hydrogen generation capacity than a refinery designed for use of a nickel-molybdenum, predominantly molybdenum, or molybdenum-only catalyst.

VI. Examples

Examples 1-9

Coconut Oil

The apparatus of Examples 1-9 was a continuous-flow reactor including a pump system, gas flow system, high-pressure reactor vessel, reactor heater and temperature regulation device, product collection receptacle, and pressure regulation device. Appropriate instrumentation and electronics were attached to the device to enable control and recording of experimental conditions. Samples of product were removed through the sample receptacle and analyzed with appropriate analytical instrumentation (e.g., gas chromatography-mass spectrometry, GC-MS). Hydrogen was supplied to the reactor system from purchased cylinders. Feedstock material was supplied to the reactor system via a high-pressure pumping system. In Examples 1-9, 1.12 kg of a nonsulfided nickel-molybdenum hydrotreating catalyst (Criterion CR-424) was charged to the reactor chamber. The chamber possessed a length-to-diameter ratio of 6. The catalyst was activated by warming to greater than 300° C. while a flow of hydrogen gas was passed over the catalyst. The moisture content of the exiting gas was measured. The activation was judged complete approximately when the water content of the exiting gas decreased.

Example 1

Coconut oil was supplied to the reactor at a rate of about 1 pound/hour. Hydrogen was supplied at a rate of about 20 standard cubic feet per hour (scfh). The reactor was maintained at about 340° C. The hydrogen pressure was regulated to about 80 psi. The temperature and flow conditions were maintained for about 3 hours once steady-state conditions were achieved. The product was collected and analyzed. Results are shown in Table 2.

TABLE 2

Results from First Test Matrix

| Example | Oil Flow, lb/hr | Temp., °C. | Pressure, psig | H₂ Flow, scfh | Saturated Hydrocarbons, % | Olefinic Hydrocarbons, % | Fatty Acids, % |
|---|---|---|---|---|---|---|---|
| 1 | 1 | 340 | 80 | 20 | 43.8 | 27.4 | 19.0 |
| 2 | 1 | 350 | 100 | 20 | 27.2 | 33.9 | 26.9 |
| 3 | 2 | 350 | 100 | 40 | 21.8 | 26.1 | 40.0 |
| 4 | 1 | 350 | 200 | 20 | 50.4 | 18.0 | 16.0 |
| 5 | 2 | 350 | 200 | 40 | 27.3 | 20.0 | 41.9 |
| 6 | 1 | 400 | 100 | 20 | 40.6 | 37.0 | 7.4 |
| 7 | 2 | 400 | 100 | 40 | 37.7 | 32.3 | 16.9 |
| 8 | 1 | 400 | 200 | 20 | 73.5 | 10.5 | 3.2 |
| 9 | 2 | 400 | 200 | 50 | 63.3 | 13.8 | 2.2 |

Example 2

Coconut oil was supplied to the reactor at a rate of about 1 pound/hour. Hydrogen was supplied at a rate of about 20 scfh. The reactor was maintained at about 350° C. The hydrogen pressure was regulated to about 100 psi. The temperature and flow conditions were maintained for about 3 hours once steady-state conditions were achieved. The product was collected and analyzed. Results are shown in Table 2.

Example 3

Coconut oil was supplied to the reactor at a rate of about 2 pounds/hour. Hydrogen was supplied at a rate of about 40 scfh. The reactor was maintained at about 350° C. The hydrogen pressure was regulated to about 100 psi. The temperature and flow conditions were maintained for about 3 hours once steady-state conditions were achieved. The product was collected and analyzed. Results are shown in Table 2.

Example 4

Coconut oil was supplied to the reactor at a rate of about 1 pound/hour. Hydrogen was supplied at a rate of about 20 scfh. The reactor was maintained at about 350° C. The hydrogen pressure was regulated to about 200 psi. The temperature and flow conditions were maintained for about 3 hours once steady-state conditions were achieved. The product was collected and analyzed. Results are shown in Table 2.

Example 5

Coconut oil was supplied to the reactor at a rate of about 2 pounds/hour. Hydrogen was supplied at a rate of about 40 scfh. The reactor was maintained at about 350° C. The hydrogen pressure was regulated to about 200 psi. The temperature and flow conditions were maintained for about 3 hours once steady-state conditions were achieved. The product was collected and analyzed. Results are shown in Table 2.

Example 6

Coconut oil was supplied to the reactor at a rate of about 1 pound/hour. Hydrogen was supplied at a rate of about 20 scfh. The reactor was maintained at about 400° C. The hydrogen pressure was regulated to about 100 psi. The temperature and flow conditions were maintained for about 3 hours once steady-state conditions were achieved. The product was collected and analyzed. Results are shown in Table 2.

Example 7

Coconut oil was supplied to the reactor at a rate of about 2 pounds/hour. Hydrogen was supplied at a rate of about 40 scfh. The reactor was maintained at about 400° C. The hydrogen pressure was regulated to about 100 psi. The temperature and flow conditions were maintained for about 3 hours once steady-state conditions were achieved. The product was collected and analyzed. Results are shown in Table 2.

Example 8

Coconut oil was supplied to the reactor at a rate of about 1 pound/hour. Hydrogen was supplied at a rate of about 20 scfh. The reactor was maintained at about 400° C. The hydrogen pressure was regulated to about 200 psi. The temperature and flow conditions were maintained for about 3 hours once steady-state conditions were achieved. The product was collected and analyzed. Results are shown in Table 2.

Example 9

Canola oil was supplied to the reactor at a rate of about 1 pound/hour. Hydrogen was supplied at a rate of about 50 scfh. The reactor was maintained at about 400° C. The hydrogen pressure was regulated to about 200 psi. The temperature and flow conditions were maintained for about 3 hours once steady-state conditions were achieved. The product was collected and analyzed. Results are shown in Table 2.

Examples 10-17

Yellow Grease

For Examples 10-17, a smaller reactor system was utilized. The reactor tube possessed a length-to-diameter ratio of about 40. The tube was loaded with a total of about 70 grams of catalyst for the experiments listed below. The feedstock for Examples 10-17 was yellow grease obtained from a french fry factory and included predominantly TAGs. The yellow grease possessed a significant (about 2.6%) FFA content.

Example 10

Yellow grease was supplied to the reactor at a rate of about 1 milliliter/minute (mL/min). Hydrogen was supplied at a rate of about 1064 standard cubic centimeters/minute (sccm). The reactor was maintained at about 474° C. The hydrogen pressure was regulated to about 750 psi. The temperature and flow conditions were maintained for about 30 minutes once steady-state conditions were achieved. The product was collected and analyzed. Results are shown in Table 3.

TABLE 3

Results from Yellow Grease as Feedstock

| Example | Oil Flow, mL/min | Temp., °C. | Pressure, psig | $H_2$ Flow, sccm | Saturated Hydrocarbons, % | Aromatic Hydrocarbons, % | Olefinic Hydrocarbons, % |
|---|---|---|---|---|---|---|---|
| 10 | 1.0 | 474 | 750 | 1064 | 90 | 9 | 0 |
| 11 | 1.0 | 480 | 750 | 1050 | 77 | 17 | 3 |
| 12 | 1.0 | 490 | 750 | 1050 | 64 | 32 | 1 |
| 13 | 1.0 | 502 | 750 | 1050 | 56 | 39 | 2 |
| 14 | 1.0 | 530 | 750 | 1050 | 37 | 60 | 1 |
| 15 | 1.5 | 498 | 750 | 1050 | 91 | 7 | 2 |
| 16 | 4.5 | 482 | 750 | 1066 | 63 | 7 | 21 |
| 17 | 4.5 | 487 | 750 | 1088 | 62 | 13 | 23 |

A mixture of reactions, including for example hydrodeoxygenation, decarboxylation, and decarbonylation reactions, can occur simultaneously during the conversion of feedstock to hydrocarbon product. The hydrodeoxygenation reactions can provide a hydrocarbon product possessing even-numbered carbon chains, such as octadecane. The decarboxylation and decarbonylation reactions provide a hydrocarbon product possessing odd-numbered carbon chains such as heptadecane. The ratio of C17 to C18 product observed was about 0.79 to 1. Coincident cracking reactions provide a mixture of lower normal hydrocarbons. The observed ratios of even- and odd-numbered hydrocarbon chains were measured as C15:C16=0.57, C13:C14=1.22, C11:C12=1.15, C9:C10=1.11, and C7:C8=1.03.

The simultaneous production of both even and odd carbon chains of varying lengths can facilitate the ultimate production of a final product including a petroleum-like fuel or fuel blendstock.

Example 11

Yellow grease was supplied to the reactor at a rate of about 1 mL/min. Hydrogen was supplied at a rate of about 1050 sccm. The reactor was maintained at 480° e. The hydrogen pressure was regulated to about 750 psi. The temperature and flow conditions were maintained for 30 minutes once steady-state conditions were achieved. The product was collected and analyzed. Results are shown in Table 3.

Example 12

Yellow grease was supplied to the reactor at a rate of about 1 mL/min. Hydrogen was supplied at a rate of about 1050 sccm. The reactor was maintained at about 490° C. The hydrogen pressure was regulated to about 750 psi. The temperature and flow conditions were maintained for about 30 minutes once steady-state conditions were achieved. The product was collected and analyzed. Results are shown in Table 3.

Example 13

Yellow grease was supplied to the reactor at a rate of 1 mL/min. Hydrogen was supplied at a rate of about 1050 sccm. The reactor was maintained at about 502° C. The hydrogen pressure was regulated to about 750 psi. The temperature and flow conditions were maintained for about 30 minutes once steady-state conditions were achieved. The product was collected and analyzed. Results are shown in Table 3.

Example 14

Yellow grease was supplied to the reactor at a rate of about 1 mL/min. Hydrogen was supplied at a rate of about 1050 sccm. The reactor was maintained at 530° C. The hydrogen pressure was regulated to about 750 psi. The temperature and flow conditions were maintained for about 30 minutes once steady-state conditions were achieved. The product was collected and analyzed. Results are shown in Table 3.

Example 15

Yellow grease was supplied to the reactor at a rate of about 1.5 mL/min. Hydrogen was supplied at a rate of about 1050 sccm. The reactor was maintained at 498° C. The hydrogen pressure was regulated to about 750 psi. The temperature and flow conditions were maintained for about 30 minutes once steady-state conditions were achieved. The product was collected and analyzed. Results are shown in Table 3.

Example 16

Yellow grease was supplied to the reactor at a rate of about 4.5 mL/min. Hydrogen was supplied at a rate of about 1066 sccm. The reactor was maintained at about 482° C. The hydrogen pressure was regulated to about 750 psi. The temperature and flow conditions were maintained for about 30 minutes once steady-state conditions were achieved. The product was collected and analyzed. Results are shown in Table 3.

Example 17

Yellow grease was supplied to the reactor at a rate of about 4.5 mL/min. Hydrogen was supplied at a rate of about 1088 sccm. The reactor was maintained at 487° C. The hydrogen pressure was regulated to about 750 psi. The temperature and flow conditions were maintained for about 30 minutes once steady-state conditions were achieved. The product was collected and analyzed. Results are shown in Table 3.

Example 18

Product Fuels

Hydrocarbon product obtained from process conditions such as those described in Tables 2 and 3 was subjected to petroleum-refining operations, including isomerization, aromatization, hydrogenation, and distillation under conditions known to those skilled in the art, such that a fuel was produced that complied with the military specification for JP-8 (MIL-DTL-83133E). The fuel possessed a flash point of 49° C., a freeze point of −52° C., and an energy density of 42.9 MJ/kg. Furthermore, the fuel complied with all aspects of MIL-DTL-83133E, including physical density, distillation (D-86), etc.

The processing of TAG, either virgin or waste, according to the examples above, provides a fuel possessing properties consistent with drop-in compatibility and fit-for-purpose usage for a variety of fuels, for example according to MIL-DTL-83133E or MIL-OTL-83133F.

Examples 19-21

Feedstock Predominantly Fatty Acids

The reactor system used for Examples 19-21 possessed a tubular reactor with internal dimensions of 1.5-inch diameter and 56-inch length. The feedstock was fatty acid from a biodiesel plant, which was removed from TAGs via a stripper column. The reactor was heated to the desired operating temperature by means of heating elements affixed to the outside of the reactor tube. Liquid was supplied to the reactor by means of a high-pressure pump that drew fatty acid in a liquid state from a heated reservoir. The fatty acid was passed through a tubular preheater prior to introduction to the tubular reactor. Hydrogen was supplied from high-pressure cylinders, with the flow rate controlled by means of a mass flow controller. The pressure of the reactor system was controlled by means of a back-pressure controller located at the end of the reactor system. The end of the reactor system possessed a chiller and a pressure letdown system to aid in sample collection. Temperatures, pressures, and flow rates were controlled via PC-driven proportional integral derivative (PID) process control software (e.g. the computer analyzed changes in temperate, derived a rate of change, then adjusted electrical power to the heating elements in proportion to the required change that maintained a relatively constant temperature).

Example 19

The reactor was charged with a nonsulfided hydrotreating catalyst (about 1.5 kg). The catalyst bed was slowly warmed to the desired operating temperature while passing a steady flow of hydrogen over the catalyst bed. A hydrogen flow of about 50 standard cubic feet per hour (scfh), liquid flow of about 2 liters per hour (lph) of fatty acid, and a reactor pressure of about 735 pounds per square inch (psi) were established. The temperature of the reactor was stabilized at about 430° C. Fatty acids as described by Sample 1 in Table 4 were pumped through the reactor, with product being formed consistent with the composition described in Table 5.

TABLE 4

Compositions of Fatty Acid Mixtures Converted to Hydrocarbons

| Fatty Acid | Sample 1, % composition | Sample 2, % composition |
| --- | --- | --- |
| C16:0 | 10.4 | 21.0 |
| C16:1 | — | 10.3 |
| C18:0 | 3.6 | 6.9 |
| C18:1 | 25.3 | 39.9 |
| C18:2 | 54.8 | 19.0 |
| C18:3 | 5.1 | — |
| C20:0 | 0.7 | 0.1 |
| C20:1 | — | 0.5 |
| Others | 0.1 | 0.3 |

TABLE 5

Hydrocarbon Distribution from Processing of Soy Fatty Acid

| Carbon Number | % n-Paraffin | % i-Paraffin | % c-Paraffin | % Olefin |
| --- | --- | --- | --- | --- |
| 18 | 35.75 | 8.2 | — | 1.89 |
| 17 | 10.34 | 2.4 | — | 1.04 |
| 16 | 14.28 | 0.83 | — | — |
| 15 | 3.95 | 0.36 | — | — |
| 14 | 1.56 | 0.14 | 0.02 | — |
| 13 | 1.23 | 0.22 | — | — |
| 12 | 1.26 | 0.26 | — | 0.08 |
| 11 | 1.18 | 0.26 | — | — |
| 10 | 1.20 | 0.24 | 0.02 | 0.08 |
| 9 | 1.05 | 0.23 | 0.04 | — |
| 8 | 1.16 | 0.31 | 0.07 | — |
| 7 | 1.15 | 1.04 | 0.18 | — |
| 6 | 0.97 | 0.24 | 0.27 | 0.06 |
| 5 | 0.67 | 0.09 | 0.15 | — |
| 4 | 0.31 | — | — | — |
| 3 | 0.07 | — | — | — |
| Totals | 76.13 | 14.82 | 0.75 | 3.15 |

The recovered mass yield of liquid products was 95.8%. Analysis indicated that about 85.0 wt % of the fatty acid had been converted to hydrocarbon and about 10.8 wt % was converted to water, with the remainder converted to other gaseous products. Analysis of the crude product mixture for fatty acids was performed. Trace amounts of fatty acid were detectable by sensitive analytical methods. The amount of fatty acid present in the hydrocarbon phase was determined by an acid-base titration, with the results expressed as mg of potassium hydroxide (KOH) consumed per gram of hydrocarbon. This test provided results of less than 0.20 milligram KOH per gram of hydrocarbon.

The processing of B99 biodiesel, which includes $C_1$-$C_5$ FAEs, produced similar results.

Example 20

The reactor was charged with a nonsulfided hydrotreating catalyst (about 1.5 kg). The catalyst bed was slowly warmed to the desired operating temperature while passing a steady flow of hydrogen over the catalyst bed. A hydrogen flow of about 50 scfh, a liquid flow of about 2 lph of fatty acid, and a reactor pressure of about 530 psi were established. The reactor temperature was stabilized at about 430° C. Fatty acid as described by Sample 2 in Table 4 was pumped through the reactor, with product being formed consistent with the composition described in Table 5. The recovered mass yield was about 97.1%. Analysis of the data indicated that about 86.8 wt % of the fatty acid had been converted to hydrocarbons and about 10.3 wt % converted to water, with the balance being converted to gaseous products.

Example 21

The reactor was charged with a catalyst possessing hydrocarbon isomerization activity. The catalyst was activated by slowly warming the catalyst to the desired operating temperature while passing a steady flow of hydrogen over the catalyst. The reactor was pressurized to the desired operating pressure, and the desired hydrogen flow rate was established. A flow of dewatered and deacidified product described in Table 5 was introduced to the reactor at an appropriate flow rate. If required, multiple passes through the isomerization catalyst bed were utilized to obtain a degree of isomerization suitable for the particular fuel product being sought. The product mixture resulting from the the dewatering, deacidification, and isomerization steps is illustrated in Table 6.

TABLE 6

Distribution of Products from Dewatering, Deacidification, and Isomerization Steps

| Carbon Number | % n-Paraffin | % i-Paraffin | % c-Paraffin | % Olefin |
|---|---|---|---|---|
| 18 | 0.22 | 4.09 | — | — |
| 17 | 1.06 | 10.91 | — | — |
| 16 | 3.25 | 8.10 | — | — |
| 15 | 1.74 | 4.68 | — | — |
| 14 | 1.05 | 2.86 | — | — |
| 13 | 1.24 | 5.44 | — | — |
| 12 | 1.40 | 6.08 | — | — |
| 11 | 1.53 | 5.77 | 0.29 | — |
| 10 | 1.67 | 6.29 | 0.46 | — |
| 9 | 1.72 | 6.03 | 0.85 | — |
| 8 | 2.02 | 4.33 | 0.94 | — |
| 7 | 1.95 | 3.45 | 1.25 | — |
| 6 | 1.55 | 2.42 | 0.54 | — |
| 5 | — | 2.25 | — | — |
| 4 | — | 0.59 | — | — |
| 3 | — | — | — | — |
| Totals | 20.40 | 73.29 | 4.33 | — |

A portion of isomerized product possessing between about 70% and 80% isomerization was subjected to distillation. A distillate cut was produced that displayed a flash point of 43° C. and a freeze point of −49° C. A fuel with such properties can be useful as a synthetic paraffinic kerosene (SPK) jet fuel. Additionally, blending such an SPK with appropriate petroleum-derived or coal derived aromatic compounds can provide a fuel possessing, for example, a flash point of 44° C., a freeze point of −59° C., and a physical density of 0.789 kilograms per liter. A fuel with such properties can be useful as JP-8, a jet fuel that complies with all fuel property requirements described in U.S. Military Fuel Specification MIL-DTL-83133F.

Example 22

Temperature Control of Proportion of Hydrocarbons having Even Numbers of Carbon Atoms versus Odd Numbers of Carbon Atoms and Cyclic Hydrocarbons Utilizing data from examples 10, 14, 16, and 17, an estimate of the enthalpy of reaction was calculated for each example, using the model equations given in Table 1. A spreadsheet utilizing enthalpies calculated in 10° C. increments between 300° C. and 530° C. was used to the overall enthalpies of reaction. Enthalpy data was subjected to a weighted-averaging for temperatures that did not fall directly on an increment. The numerical enthalpies resulting from the calculations are shown in Table 7.

TABLE 7

Calculated Estimated Enthalpies for Examples 10, 14, 16, and 17.

| Example | Reaction Temperature (° C.) | Calculated Enthalpy (kcal/mole) |
|---|---|---|
| 10 | 474 | −178.817 |
| 14 | 482 | −147.176 |
| 16 | 487 | −143.832 |
| 17 | 530 | −50.752 |

Figure 2:
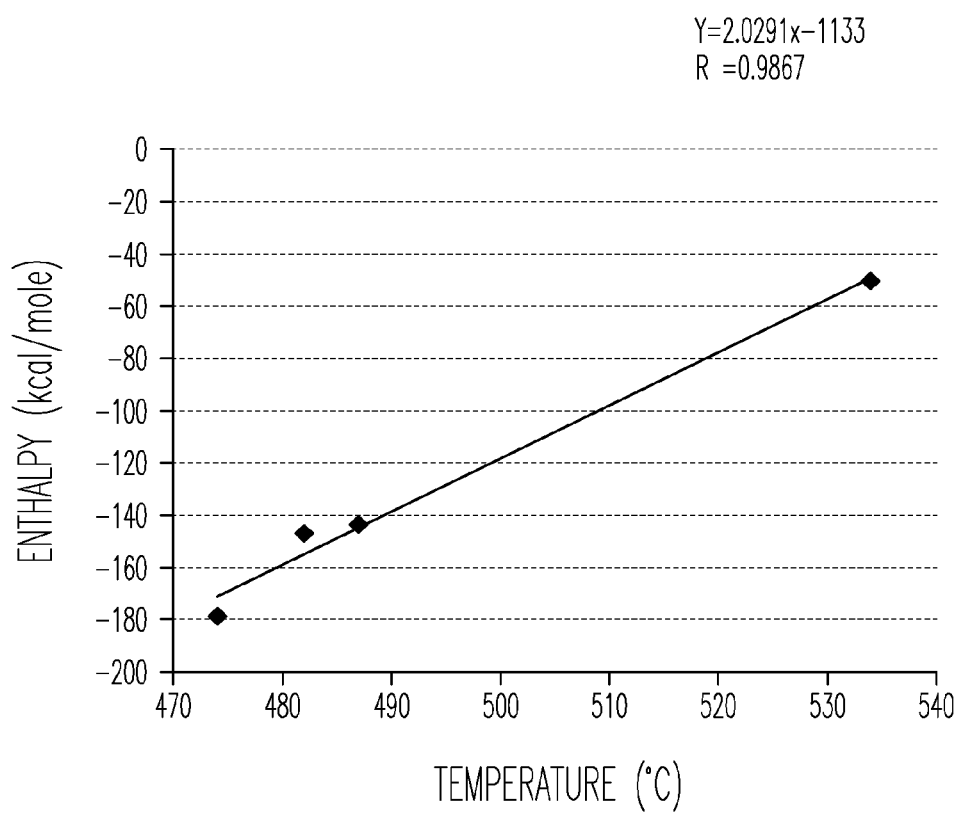
FIG. 2 illustrates calculated enthalpy versus temperature, according to various embodiments.

Graphically, the results are presented in FIG. 2, which illustrates calculated enthalpy versus temperature.

In Examples such as Examples 10, 14, 16, and 17, it was observed that as temperature increased the proportion of $C_{18}$ product decreases, while the proportion of $C_{17}$ product increased. Additionally, as temperature increases, the amount of aromatic product formed also increased. The trend data extracted from gas chromatograms is shown in Table 8. The use of the nonsulfided catalyst allows higher temperatures, which as shown herein can cause the formation of larger proportions of cyclic hydrocarbons (e.g. see "aromatics" in Table 8), which can advantageously allow the more efficient production of fuels and fuel blendstocks suitable as jet fuels.

TABLE 8

Extracted Data from Gas Chromatography

| Example | Temperature (° C.) | % $C_{17}$ | % $C_{18}$ | % Aromatics |
|---|---|---|---|---|
| 10 | 474 | 38.6 | 61.4 | 9.2 |
| 14 | 530 | 100 | 0 | 60 |
| 16 | 482 | 63 | 37 | 7.4 |
| 17 | 487 | 62 | 38 | 12.6 |

Example 23

Catalyst Control of Product Distribution

To determine the relative value of the individual catalytic metals present in a nickel-molybdenum hydrotreating catalyst, custom prepared catalysts were acquired that were identical to a commercial nickel-molybdenum hydrotreating catalyst except that one sample contained only nickel, and the second sample contained only molybdenum. A summary of results obtained from these catalysts are shown in Table 9. The calculations were conducted for a temperature of 350° C. The system was operated in a bottom-up flow configuration at 1000 psig, 0.75-1.0 mL/min canola oil, 1000 sccm $H^2$, and 370° C. at the top of the bed.

TABLE 9

Results obtained from Ni-only or Mo-only Catalysts

| Catalyst | n-$C_{17}$ (area percent) | n-$C_{18}$ (area percent) | Calculated Enthalpy (kcal/mole) |
|---|---|---|---|
| Molybdenum-only | 9.02 | 41.95 | −212.7 |
| Nickel-only | 69.63 | 18.70 | −128.6 |

The data shown in Table 9 shows only 50.97% closure (e.g. only 50.97% of materials were accounted for in n-$C^{17}$ and n-$C^{18}$ areas) for the molybdenum-only catalyst, but 88.33% closure for the nickel-only catalyst. This is likely due to the fact that use the molybdenum-only catalyst resulted in significant formation of iso-paraffins as well as normal-paraffins, as well as paraffins resulting from cracking processes, evidenced including by the gas chromatogram generated by the samples. In contrast, the nickel-only catalyst showed virtually no formation of iso-paraffins, and little formation of products arising from cracking processes. However, the nickel-only catalyst showed a greater tendency to produce odd-carbon chain products, arising from for example decarbonylation or decarboxylation reactions, versus the molybdenum-only catalyst. A greater tendency toward decarbonylation or decarboxylation can lead to a significant difference in the heat generated during a hydrotreatment reaction. The nickel-only catalyst is calculated to provide a much lower enthalpy of reaction, thereby potentially leading to a reactor design that does not require as extensive heat management hardware as would a nickel-molybdenum reactor design, or a molybdenum-only design. Additionally, the use of a nickel-only catalyst would lead to greatly reduced hydrogen consumption. Therefore a stand-alone renewable fuel refinery would require less hydrogen generation capacity than a refinery designed for use of a nickel-molybdenum or molybdenum-only catalyst.

While various embodiments of the invention have been shown and described, modifications thereof can be made by one skilled in the art without departing from the spirit and teachings of the disclosure. The embodiments described herein are exemplary only and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). Use of the term "optionally" with respect to any element of a claim is intended to mean that the subject element is required or, alternatively, is not required. Both alternatives are intended to be within the scope of the claim. Use of broader terms such as comprises, includes, having, etc., should be understood to provide support for narrower terms such as consisting of, consisting essentially of, comprised substantially of, etc.

References in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Accordingly, the scope of protection is not limited by the description set out above but is only limited by the claims that follow, that scope including all equivalents of the subject matter of the claims. Each and every claim is incorporated into the specification as an embodiment of the present invention. Thus the claims are a further description and are an addition to the preferred embodiments of the present invention. The discussion of a reference is not an admission that it is prior art to the present invention.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. The disclosures of all patents, patent applications, and publications cited herein are hereby incorporated by reference, to the extent they provide exemplary, procedural, or other details supplementary to those set forth herein.

Additional Embodiments

The present invention provides for the following exemplary embodiments, the numbering of which is not to be construed as designating levels of importance:

Embodiment 1 provides a method of producing a hydrocarbon product, the method including: hydrotreating a feedstock including at least one of a renewable triacylglyceride (TAG), renewable fatty acid, renewable fatty acid $C_1$-$C_5$ alkyl ester ($C_1$-$C_5$ FAE), or a mixture thereof, in the presence of a nonsulfided hydrotreating catalyst, to produce a first product including hydrocarbons; wherein the renewable TAG, renewable FFA, and renewable $C_1$-$C_5$ FAE include fatty acid units that have an even number of carbon atoms; wherein in the first product, a proportion of hydrocarbons with an odd-number of carbon atoms, cyclic hydrocarbons, or hydrocarbons with an even-number of carbon atoms is dependent on an average temperature used during the hydrotreating.

Embodiment 2 provides the method of Embodiment 1, wherein greater than 90 mol % of the fatty acid groups in the renewable TAG, renewable FFA, and renewable $C_1$-$C_5$ FAE have an even number of carbon atoms.

Embodiment 3 the method of any one of Embodiments 1-2, further including controlling the average temperature during hydrotreating to be a higher average temperature, such that in the first product the ratio of hydrocarbons having an odd-number of carbon atoms to hydrocarbons having an even-number of carbon atoms is higher, or the ratio of cyclic hydrocarbons to hydrocarbons having an even-number of carbon atoms is higher, as compared to a corresponding ratio obtained wherein the average temperature used during hydrotreating is controlled to be a lower average temperature.

Embodiment 4 provides the method of any one of Embodiments 1-3, further including controlling the average temperature during hydrotreating to be a lower average temperature, such that in the first product the ratio of hydrocarbons having an odd-number of carbon atoms to hydrocarbons having an even-number of carbon atoms is lower, or the ratio of cyclic hydrocarbons to hydrocarbons having an even-number of carbon atoms is lower, as compared to a corresponding ratio obtained wherein the average temperature used during hydrotreating is controlled to be a higher average temperature.

Embodiment 5 provides the method of any one of Embodiments 1-4 wherein the nonsulfided hydrotreating catalyst includes at least one metal selected from Groups 6, 8, 9, and 10 of the periodic table.

Embodiment 6 provides the method of any one of Embodiments 1-5, wherein the hydrotreating catalyst includes molybdenum (Mo).

Embodiment 7 provides the method of any one of Embodiments 1-6, wherein in the first product, a proportion of at least one of paraffins resulting from cracking processes or iso-paraffins is greater as compared to a corresponding proportion of at least one of paraffins resulting from cracking processes or iso-paraffins obtained when the hydrotreating catalyst has less or no molybdenum.

Embodiment 8 provides the method of any one of Embodiments 5-7 wherein the hydrotreating catalyst includes nickel (Ni).

Embodiment 9 provides the method of Embodiment 8, wherein in the first product, a proportion of hydrocarbons having an odd number of carbon atoms is greater as compared to a proportion of hydrocarbons having an odd number of carbon atoms when the hydrotreating catalyst has less or no nickel.

Embodiment 10 provides the method of any one of Embodiments 5-9 wherein the hydrotreating catalyst includes at least one metal selected from the group consisting of palladium (Pd), platinum (Pt), nickel (Ni), and combinations thereof Embodiment 11 provides the method of any one of Embodiments 5-10 wherein the hydrotreating catalyst includes nickel and molybdenum or cobalt and molybdenum.

Embodiment 12 provides the method of any one of Embodiments 5-11 wherein the hydrotreating catalyst further includes a support selected from alumina, silica, and combinations thereof.

Embodiment 13 provides the method of any one of Embodiments 1-12 wherein the TAG in the feedstock is derived from at least one of plants, animals, algae, other microorganisms, or combinations thereof.

Embodiment 14 provides the method of any one of Embodiments 1-13 wherein the renewable fatty acid in the feedstock is derived from hydrolysis of a renewable TAG.

Embodiment 15 provides the method of any one of Embodiments 1-14 wherein the renewable $C_1$-$C_5$ FAE in the feedstock is derived from a renewable TAG.

Embodiment 16 provides the method of any one of Embodiments 1-15 wherein hydrotreating is performed at a temperature in the range of about 340° to about 400° C. and a pressure in the range of about 500 psig to about 750 psig.

Embodiment 17 provides the method of Embodiment 16 further including subjecting the first product to at least one process selected from isomerization, cracking, and aromatization to produce a second product suitable for use as gasoline, naptha, kerosene, jet fuels, or diesel fuels.

Embodiment 18 provides the method of any one of Embodiments 1-17 wherein hydrotreating is performed at a temperature in the range of about 470° to about 530° C. and a pressure in the range of about 750 psig to about 1000 psig.

Embodiment 19 provides the method of Embodiment 18 wherein the first product includes greater than 50 wt % saturated and aromatic hydrocarbons.

Embodiment 20 provides a method of producing a transportation fuel, the method including: hydrotreating a feedstock including at least one of a renewable triacylglyceride (TAG), renewable fatty acid, renewable fatty acid $C_1$-$C_5$ alkyl ester ($C_1$-$C_5$ FAE), or a mixture thereof, in the presence of a nonsulfided hydrotreating catalyst, to produce a first product including hydrocarbons; and subjecting the first product to at least one process selected from aromatization, cracking, and isomerization, to produce a second hydrocarbon product selected from gasoline, naptha, kerosene, jet fuel, and diesel fuels; wherein the renewable TAG, renewable FFA, and renewable $C_1$-$C_5$ FAE include fatty acid units that have an even number of carbon atoms wherein in the first product, a proportion of hydrocarbons with an odd-number of carbon atoms, cyclic hydrocarbons, or hydrocarbons with an even-number of carbon atoms is dependent on an average temperature used during the hydrotreating.

Embodiment 21 provides a method of producing a hydrocarbon product, the method including: hydrotreating a feedstock including at least one of a renewable triacylglyceride (TAG), renewable fatty acid (FFA), renewable fatty acid $C_1$-$C_5$ alkyl ester ($C_1$-$C_5$ FAE), or a mixture thereof, in the presence of a nonsulfided hydrotreating catalyst, to produce a first product including hydrocarbons.

Embodiment 22 provides the apparatus or method of any one or any combination of Embodiments 1-21 optionally configured such that all elements or options recited are available to use or select from.

We claim:

1. A method of producing a hydrocarbon product, the method comprising:
    hydrotreating a feedstock comprising at least one of a renewable triacylglyceride (TAG), renewable fatty acid, renewable fatty acid $C_1$-$C_5$ alkyl ester ($C_1$-$C_5$ FAE), and a mixture thereof, in the presence of a nonsulfided hydrotreating catalyst, to produce a first product comprising hydrocarbons and optionally to produce unconverted starting material comprising the at least one of the renewable triacylglyceride (TAG), the renewable fatty acid, the renewable fatty acid $C_1$-$C_5$ alkyl ester ($C_1$-$C_5$ FAE), and the mixture thereof, wherein in the first product, a concentration of at least one of hydrocarbons with an odd-number of carbon atoms, cyclic hydrocarbons, and hydrocarbons with an even-number of carbon atoms, is dependent on a temperature used during the hydrotreating; and
    controlling the temperature of the hydrotreating to be a first temperature such that a weight ratio of the hydrocarbons having an even-number of carbon atoms to the hydrocarbons having an odd-number of carbon atoms is greater than 1:1, and then further comprising increasing the first temperature by an amount of about 8° C. to about 55° C., such that the weight ratio of the hydrocarbons having an even-number of carbon atoms to the hydrocarbons having an odd-number of carbon atoms decreases to less than 1:1;
    wherein the renewable TAG, renewable fatty acid, and renewable $C_1$-$C_5$ FAE comprise fatty acid units that have an even number of carbon atoms.

2. The method of claim 1, wherein greater than 90 mol % of the fatty acid groups in the renewable TAG, renewable fatty acid, and renewable $C_1$-$C_5$ FAE have an even number of carbon atoms.

3. The method of claim 1, wherein the optional unconverted starting material is produced.

4. The method of claim 1, wherein during the hydrotreating at least 58 wt % of the at least one of the renewable triacylglyceride (TAG), the renewable fatty acid, the renewable fatty acid $C_1$-$C_5$ alkyl ester ($C_1$-$C_5$ FAE), and the mixture thereof is converted to other materials comprising the first product.

5. The method of claim 1, wherein during the hydrotreating at least 81 wt % of the at least one of the renewable triacylglyceride (TAG), the renewable fatty acid, the renewable fatty acid $C_1$-$C_5$ alkyl ester ($C_1$-$C_5$ FAE), and the mixture thereof is converted to other materials comprising the first product.

6. The method of claim 1, further comprising controlling the temperature of the hydrotreating to be a higher temperature such that the concentration of the hydrocarbons in the first product having an even-number of carbon atoms decreases and the concentration of the hydrocarbons in the first product having an odd-number of carbon atoms increases.

7. The method of claim 1, further comprising controlling the temperature of the hydrotreating to be a higher temperature such that a concentration of the hydrocarbons in the first product that are aromatic increases.

8. The method of claim 1, further comprising controlling the temperature of the hydrotreating to be a lower temperature such that the concentration of the hydrocarbons in the first product having an even-number of carbon atoms increases and the concentration of the hydrocarbons in the first product having an odd number of carbon atoms decreases.

9. The method of claim 1, further comprising controlling the temperature of the hydrotreating to be a lower temperature such that a concentration of the hydrocarbons in the first product that are aromatic decreases.

10. The method of claim 1, further comprising controlling the temperature of the hydrotreatment to be about 150° C. to about 475° C. such that a weight ratio of the hydrocarbons in the first product having an even-number of carbon atoms to the hydrocarbons in the first product having an odd-number of carbon atoms is greater than 1:1.

11. The method of claim 1, further comprising controlling the temperature of the hydrotreatment to be about 482° C. to about 530° C. such that a weight ratio of the hydrocarbons in the first product having an even-number of carbon atoms to the hydrocarbons in the first product having an odd-number of carbon atoms is less than 1:1.

12. The method of claim 1, further comprising controlling the temperature of the hydrotreating to be a second temperature such that a weight ratio of the hydrocarbons having an even-number of carbon atoms to the hydrocarbons having an odd-number of carbon atoms is less than 1:1, and then further comprising decreasing the second temperature by an amount of about 8° C. to about 55° C. such that the weight ratio of the hydrocarbons having an even-number of carbon atoms to the hydrocarbons having an odd-number of carbon atoms increases to greater than 1:1.

13. The method of claim 1, wherein the controlling the temperature of the hydrotreatment to be the first temperature such that a weight ratio of the hydrocarbons having an even-number of carbons atoms to the hydrocarbons having an odd-number of carbon atoms is equal to greater than about 60:40, and the increasing of the first temperature comprises increasing the first temperature by about 13° C. to about 55° C. such that the weight ratio of the hydrocarbons having an even-number of carbon atoms to the hydrocarbons having an odd-number of carbon atoms decreases to about 38:62.

14. The method of claim 1, further comprising controlling the temperature of the hydrotreatment to be a second temperature such that a weight ratio of the hydrocarbons in a second product having an even-number of carbons atoms to the hydrocarbons in the second product having an odd-number of carbon atoms is equal to or less than about 38:62, and then further comprising decreasing the second temperature by about 13° C. to about 55° C. such that the weight ratio of the hydrocarbons in the second product having an even-number of carbon atoms to the hydrocarbons in the second product having an odd-number of carbon atoms increases to about 60:40 or more.

15. The method of claim 1, wherein the controlling the temperature of the hydrotreatment to be the first temperature is such that the weight ratio of the hydrocarbons having an even-number of carbon atoms to the hydrocarbons having an odd-number of carbon atoms is equal to or greater than about 60:40, and the increasing of the first temperature comprises increasing the first temperature by about 55° C. such that the weight ratio of the hydrocarbons in the first product having an even-number of carbon atoms to the hydrocarbons in the first product having an odd-number of carbon atoms decreases to about 0:100.

16. The method of claim 1, further comprising controlling the temperature of the hydrotreatment to be a second temperature such that a weight ratio of the hydrocarbons in a second product having an even-number of carbon atoms to the hydrocarbons in the second product having an odd-number of carbon atoms is equal to about 0:100, and then further comprising decreasing the second temperature by about 55° C. such that a weight ratio of the hydrocarbons in the second product having an even-number of carbon atoms to the hydrocarbons in the second product having an odd-number of carbon atoms increases to about 60:40 or more.

17. The method of claim 1, wherein in the first product, the concentration of hydrocarbons with an odd-number of carbon atoms, cyclic hydrocarbons, or hydrocarbons with an even-number of carbon atoms is dependent on the type of nonsulfided hydrotreating catalyst used during the hydrotreating.

18. A method of producing a hydrocarbon product, the method comprising:
- hydrotreating a feedstock comprising at least one of a renewable triacylglyceride (TAG), renewable fatty acid, renewable fatty acid $C_1$-$C_5$ alkyl ester ($C_1$-$C_5$ FAE), and a mixture thereof, in the presence of a nonsulfided hydrotreating catalyst comprising molybdenum, to produce a first product comprising hydrocarbons and optionally to produce unconverted starting material comprising the at least one of the renewable triacylglyceride (TAG), the renewable fatty acid, the renewable fatty acid $C_1$-$C_5$ alkyl ester ($C_1$-$C_5$ FAE), and the mixture thereof; and
- controlling the temperature of the hydrotreating to be a first temperature such that a weight ratio of the hydrocarbons having an even-number of carbon atoms to the hydrocarbons having an odd-number of carbon atoms is greater than 1:1, and then further comprising increasing the first temperature by an amount of about 8° C. to about 55° C., such that the weight ratio of the hydrocarbons having an even-number of carbon atoms to the hydrocarbons having an odd-number of carbon atoms decreases to less than 1:1;
- wherein the renewable TAG, renewable fatty acid, and renewable $C_1$-$C_5$ FAE comprise fatty acid units that have an even number of carbon atoms;
- wherein in the first product, a concentration of at least one of paraffins resulting from cracking processes and iso-paraffins is greater as compared to a corresponding concentration of at least one of paraffins resulting from cracking processes and iso-paraffins obtained when the hydrotreating catalyst comprises less or no molybdenum.

19. A method of producing a hydrocarbon product, the method comprising:
- hydrotreating a feedstock comprising at least one of a renewable triacylglyceride (TAG), renewable fatty acid, renewable fatty acid $C_1$-$C_5$ alkyl ester ($C_1$-$C_5$ FAE), and a mixture thereof, in the presence of a nonsulfided hydrotreating catalyst comprising nickel, to produce a first product comprising hydrocarbons and optionally to produce unconverted starting material comprising the at least one of the renewable triacylglyceride (TAG), the renewable fatty acid, the renewable fatty acid $C_1$-$C_5$ alkyl ester ($C_1$-$C_5$ FAE), and the mixture thereof; and
- controlling the temperature of the hydrotreating to be a first temperature such that a weight ratio of the hydrocarbons having an even-number of carbon atoms to the hydrocarbons having an odd-number of carbon atoms is greater than 1:1, and then further comprising increasing the first temperature by an amount of about 8° C. to about 55° C., such that the weight ratio of the hydrocarbons having an even-number of carbon atoms to the hydrocarbons having an odd-number of carbon atoms decreases to less than 1:1;

wherein the renewable TAG, renewable fatty acid, and renewable $C_1$-$C_5$ FAE comprise fatty acid units that have an even number of carbon atoms;

wherein in the first product, a concentration of hydrocarbons having an odd number of carbon atoms is greater as compared to a concentration of hydrocarbons having an odd number of carbon atoms when the hydrotreating catalyst comprises less or no nickel.

20. The method of claim 19, wherein in the first product, a concentration of at least one of paraffins resulting from cracking processes and iso-paraffins is less as compared to a corresponding concentration of at least one of paraffins resulting from cracking processes and iso-paraffins obtained when the hydrotreating catalyst comprises less or no nickel.

* * * * *